(12) United States Patent
Kowalczyk et al.

(10) Patent No.: US 8,148,992 B2
(45) Date of Patent: Apr. 3, 2012

(54) UNDERWATER ELECTRIC FIELD ELECTROMAGNETIC PROSPECTING SYSTEM

(75) Inventors: Peter Kowalczyk, Surrey (CA); Cliff Candy, West Vancouver (CA)

(73) Assignee: Ocean Floor Geophysics, Inc., Vancouver, BC (CA)

( * ) Notice: Subject to any disclaimer, the term of this patent is extended or adjusted under 35 U.S.C. 154(b) by 386 days.

(21) Appl. No.: 12/119,976

(22) Filed: May 13, 2008

(65) Prior Publication Data

US 2008/0284441 A1    Nov. 20, 2008

Related U.S. Application Data

(60) Provisional application No. 60/917,826, filed on May 14, 2007, provisional application No. 60/950,827, filed on Jul. 19, 2007.

(51) Int. Cl.
*G01V 3/00* (2006.01)

(52) U.S. Cl. ........................................ 324/365

(58) Field of Classification Search .................. 324/332, 324/334, 337, 344, 345, 365
See application file for complete search history.

(56) References Cited

U.S. PATENT DOCUMENTS

| | | | |
|---|---|---|---|
| 3,124,742 A * | 3/1964 | Schneider | 324/373 |
| 3,514,693 A | 5/1970 | Cagniard | |
| 3,875,497 A | 4/1975 | Madsen | |
| 3,978,396 A | 8/1976 | Inouye et al. | |
| 4,047,098 A | 9/1977 | Duroux | |
| 4,458,205 A | 7/1984 | Hings | |
| 4,507,611 A | 3/1985 | Helms | |
| 4,789,240 A | 12/1988 | Bush | |
| 5,691,957 A | 11/1997 | Spiesberger | |
| 5,770,945 A | 6/1998 | Constable | |
| 6,335,624 B1 | 1/2002 | Berthier et al. | |
| 6,842,006 B2 | 1/2005 | Conti et al. | |
| 7,023,213 B2 | 4/2006 | Nichols | |
| 7,109,717 B2 | 9/2006 | Constable | |
| 7,116,108 B2 | 10/2006 | Constable | |
| 7,126,338 B2 | 10/2006 | MacGregor et al. | |
| 7,141,968 B2 | 11/2006 | Hibbs et al. | |
| 7,190,169 B2 | 3/2007 | Fanini et al. | |
| 7,191,063 B2 | 3/2007 | Tompkins | |
| 7,202,669 B2 | 4/2007 | Ellingsrud et al. | |
| 7,362,102 B2 | 4/2008 | Andreis | |
| 7,598,741 B2 * | 10/2009 | Fanini et al. | 324/339 |
| 2007/0145980 A1 | 6/2007 | Conti et al. | |

(Continued)

FOREIGN PATENT DOCUMENTS

CA    2594285    7/2006

(Continued)

OTHER PUBLICATIONS

"Electromagnetic Survey Results Outline Continuity and Extensions at Solwara 1", News Release, Nautilus Minerals Inc., Nov. 19, 2007, 3 pages, Vancouver, British Columbia.

(Continued)

*Primary Examiner* — Reena Aurora
(74) *Attorney, Agent, or Firm* — Sheridan Ross P.C.

(57) ABSTRACT

The present invention, in various embodiments, is directed to a geophysical system and method in which a transmitter coil is oriented with its axis horizontally, and a sensor is positioned below the coil to measure an ambient electrical and/or magnetic parameter associated with a conductive medium surrounding the at least one transmitter coil.

26 Claims, 17 Drawing Sheets

U.S. PATENT DOCUMENTS

| | | | | |
|---|---|---|---|---|
| 2007/0235225 A1* | 10/2007 | Bittar | | 175/40 |
| 2007/0288211 A1 | 12/2007 | MacGregor et al. | | |
| 2008/0265896 A1* | 10/2008 | Strack et al. | | 324/350 |

FOREIGN PATENT DOCUMENTS

| | | |
|---|---|---|
| CA | 2636376 | 7/2007 |
| EP | 1887386 | 2/2008 |
| GB | 1239953 | 7/1971 |
| GB | 2422673 | 8/2006 |
| GB | 2435693 | 9/2007 |
| RU | 2236028 | 9/2004 |
| WO | WO 95/24663 | 9/1995 |
| WO | WO 03/100466 | 12/2003 |
| WO | WO 03/104844 | 12/2003 |
| WO | WO 2006/130043 | 12/2006 |
| WO | WO 2007/080167 | 7/2007 |
| WO | WO 2007/089486 | 8/2007 |

OTHER PUBLICATIONS

Chave et al., "Electrical Exploration Methods for the Seafloor", in Electromagnetic Methods in Applied Geophysics, (Nabighian, M.N. Ed.), 02:931-966, Society of Experimental Geophysics.

Constable et al., "Marine Controlled Source EM Imaging of a Crustal Magna Chamber", IAGA WG 1.2 on Electromagnetic Induction in the Earth, El Vendrell, Spain, Sep. 17-23, 2006, 32 pages.

Edwards, et al., "Using an electric downhole tranmitter to detect a resistive target in a marine environment", IAGA WG 1.2 on Electromagnetic Induction in the Earth, El Vendrell, Spain, Sep. 17-23, 2006, 4 pages.

Kapinos et al., "Imaging of the South Chilean subduction zone with an amphibious magnetotelluric experiment", pp. 74-100, Berlin, Germany.

Key et al., "Mantle Upwelling Beneath the East Pacific Rise at 9° 30' N", pp. 1-5, Scripps Institution of Oceanography, La Jolla, CA, 18th IAGA WG 1.2 Workshop on Electromagnetic Induction in the Earth, El Vendrell, Spain, Sep. 17-23, 2006.

Sinha, "One the Use of Dimesionless Units for Amplitude Data and Time Units for 'Phase' Data in Marine Controlled-Source EM Studies", pp. 1-4, National Oceanography Centre, Southampton, United Kingdom, 18th IAGA WG 1.2 Workshop on Electromagnetic Induction in the Earth, El Vendrell, Spain, Sep. 17-23, 2006.

Toh, et al., "Undulation of 410-km discontinuity beneath the Phillipine Sea plate as inferred from geomagnetic vertical gradient sounding method", pp. 1-4, University of Toyama, Department of Earth Sciences, Toyama, Japan, 18th IAGA WG 1.2 Workshop on Electromagnetic Induction in the Earth, El Vendrell, Spain, Sep. 17-23, 2006.

Weitemeyer, et al., "Marine electomagnetic studies of Hydrate Ridge, Oregon, USA—imaging hydrates and the accretionary complex", pp. 1-4, University of California San Diego, Scripps Institution of Oceanography, La Jolla, CA, 18th IAGA WG 1.2 Workshop on Electromagnetic Induction in the Earth, El Vendrell, Spain, Sep. 17-23, 2006.

Zhdanov et al, "Fast and rigorous inversion of marine CSEM data using iterative migration", pp. 1-4, University of Utah, Salt Lake City, Utah, 18th IAGA WG 1.2 Workshop on Electromagnetic Induction in the Earth, El Vendrell, Spain, Sep. 17-23, 2006.

International Search Report for International (PCT) Application No. PCT/IB2008/003467, mailed May 19, 2009.

Written Opinion for International (PCT) Application No. PCT/IB2008/003467, mailed May 19, 2009.

Background of the Invention for the above-captioned application (previously provided).

International Preliminary Report on Patentability for International (PCT) Patent Application No. PCT/IB2008/003467, mailed Mar. 31, 2011, 9 pages.

Examination Report for New Zealand Patent Application No. 581872, dated May 3, 2011, 2 pages.

* cited by examiner

UNDERWATER ELECTRIC FIELD ELECTROMAGNETIC PROSPECTING SYSTEM

CROSS REFERENCE TO RELATED APPLICATION

The present application claims the benefits of U.S. Provisional Application Ser. Nos. 60/917,826, filed May 14, 2007, 60/950,827, filed Jul. 19, 2007, of the same title, each of which is incorporated herein by this reference in its entirety.

FIELD

The invention relates generally to geophysical devices and methods and particularly to underwater geophysical devices and methods.

BACKGROUND

As surface-accessible deposits of hydrocarbons and minerals are exploited, underwater deposits are becoming increasingly important. In oil and gas, for example, technology to locate and exploit hydrocarbon deposits is relatively mature. In mineralized deposits, however, such technology is in its infancy.

Common techniques for locating subterranean deposits of hydrocarbons and minerals include seismic analysis, Magneto Tellurics ("MT"), and Direct Current ("DC") resistivity measurements. In seismic analysis, seismic waves are emitted into subsurface formations and the reflected or diffracted waves detected. Acoustic waves reflect off interfaces between different types of rocks with dissimilar seismic impedances. MT is a low-frequency electromagnetic induction method for determining the subsurface distribution of electrical resistivity ($\rho$), or its inverse electrical conductivity ($\sigma$), using measurements of naturally occurring magnetic and electric fields. In DC resistivity, current is flowed through a formation and the resultant voltage drops across spaced-apart electrodes or magnetic fields produced by the current measured.

Several methods are now used to measure the resistivity structure of the ocean bottom. In one method, coils are used as both the transmitter and receiver. This system is analogous to systems used on land and in airborne prospecting systems (for example in helicopter electromagnetic prospecting systems). In another method, an electric current dipole is used as a transmitter, and an e-field dipole is used as a receiver. This system is analogous to prospecting systems used on land, for example induced polarization prospecting systems. In another method, a controlled electric current dipole is moved through the water and E-field and H-field measurements are made by an array of E-field and H-field sensors positioned at fixed sites on the ocean bottom. This is called CSEM (Controlled Source ElectroMagnetics) and is analogous to CSAMT (Controlled Source Audio Magneto Tellurics) surveys used on land. In another method, pipe tracking EM systems primarily use colinear coils (normally two horizontal coils) for transmitting and receiving and detect a perturbed secondary magnetic field in phase or amplitude, or transmit an alternating current through a direct electrical connection into a pipe or cable and then detect the resulting alternating magnetic field using a receiver coil. These systems can be difficult to deploy underwater. In normal practice, they are used to measure large scale conductivity structures and lack the small footprint needed for small scale conductive or resistive features on the ocean bottom.

SUMMARY

These and other needs are addressed by the various embodiments and configurations of the present invention. The invention is directed generally to a geophysical method and system for detecting selected objects, particularly in underwater applications.

In a first embodiment, a geophysical method includes the steps:

(a) providing a transmitter coil, the coil being oriented vertically;

(b) providing a sensor, positioned below the coil, to measure an ambient electrical and/or magnetic parameter associated with a conductive medium surrounding the transmitter coil;

(c) passing, through the transmitter coil, electrical energy having a selected waveform; and (d) while passing electrical energy through the coil, receiving, from the sensor, a signal proportional to the measured ambient electrical and/or magnetic parameter.

In a second embodiment, a geophysical system includes:

(a) a vertically oriented transmitter coil;

(b) a sensor, positioned below the coil, to measure an ambient electrical and/or magnetic parameter associated with a conductive medium surrounding the transmitter coil; and (c) a power source to pass, through the transmitter coil, electrical energy having a selected waveform, wherein, while passing electrical energy through the coil, the sensor receives a signal proportional to the measured ambient electrical and/or magnetic parameter.

The sensor can be an E-field and/or H-field sensor, depending on the application. Theoretically, the electrode (E-Field) sensor can be replaced with a magnetic (B-Field) sensor, as the electric and magnetic fields are related by Faraday's law.

The measured parameter can be, for example, voltage, current, frequency content, phase, field strength, time lag, flux, and combinations thereof.

In one configuration, multiple transmitter coils, which may be excited simultaneously or at different times, are used to provide more detailed information regarding the electromagnetic characteristics of the ocean floor. In this configuration, multiple sensors may also be employed.

The present invention can provide a number of advantages depending on the particular configuration. By way of example, a large amount of power can be discharged into the surrounding conductive medium (e.g., water) without having any electrical connection to it. This can eliminate corrosion problems and make the system safer to operate. Safety benefits include eliminating potential high-power voltage sources that personnel might touch. In addition, isolating electrical connections from seawater is typically done in subsea equipment design to reduce the probability of short circuits if a cable is pinched or a connector leaks. The electrical impedance of a transmitter coil can be selected to be not much different from that of an audio speaker. Therefore, suitable power amplifiers can be obtained without much difficulty. On the other hand, if one were to generate current directly into the water through electrodes, the low impedance of seawater requires special low-voltage, high-current amplifiers to get the same type of power output. The coil orientation can enable one to direct the current field downward into the ocean floor, at any angle and direction, which is commonly not possible with a pair of current electrodes as the transmitter. In contrast, the Controlled Source Electromagnetics ("CSEM") approach uses transmit electrodes. The invention can be highly portable, which makes it suitable for highly directed surveys that can be done in rugged terrain. The sensor electrodes can be relatively small and light and placed at arbitrary positions. B-Field coils are heavier and measure fields very locally. If one were to measure the resistivity averaged over the same distance (e.g. 2 meters) with a B-Field coil, the coil would be at least 2 meters long. With electrodes as sensors, one typically need only place a pair of them the required distance apart for effective measurements. Furthermore, because the local conductivity will change near the seafloor, the induced current will channel into or away from the bottom. One or more pairs of electrodes can be located to specifically monitor this phenomenon. Electrodes as sensors can also provide a cleaner and sharper response.

These and other advantages will be apparent from the disclosure of the invention(s) contained herein.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "E-field" refers to the electric vector field.

The term "H-field" refers to the magnetic vector field.

The term "B-field" refers to the magnetic flux density field.

The term "J-field" refers to the electric current density field.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "ocean" refers to any body of water or other conductive fluid, whether or not salinated. Thus, "ocean" refers to a body of fresh or salt water, regardless of its size.

The term "ocean bottom" refers to an interface between the conductive fluid containing the geophysical measurement system and a solid body being investigated.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The Geophysical Exploration System

Figure 1:
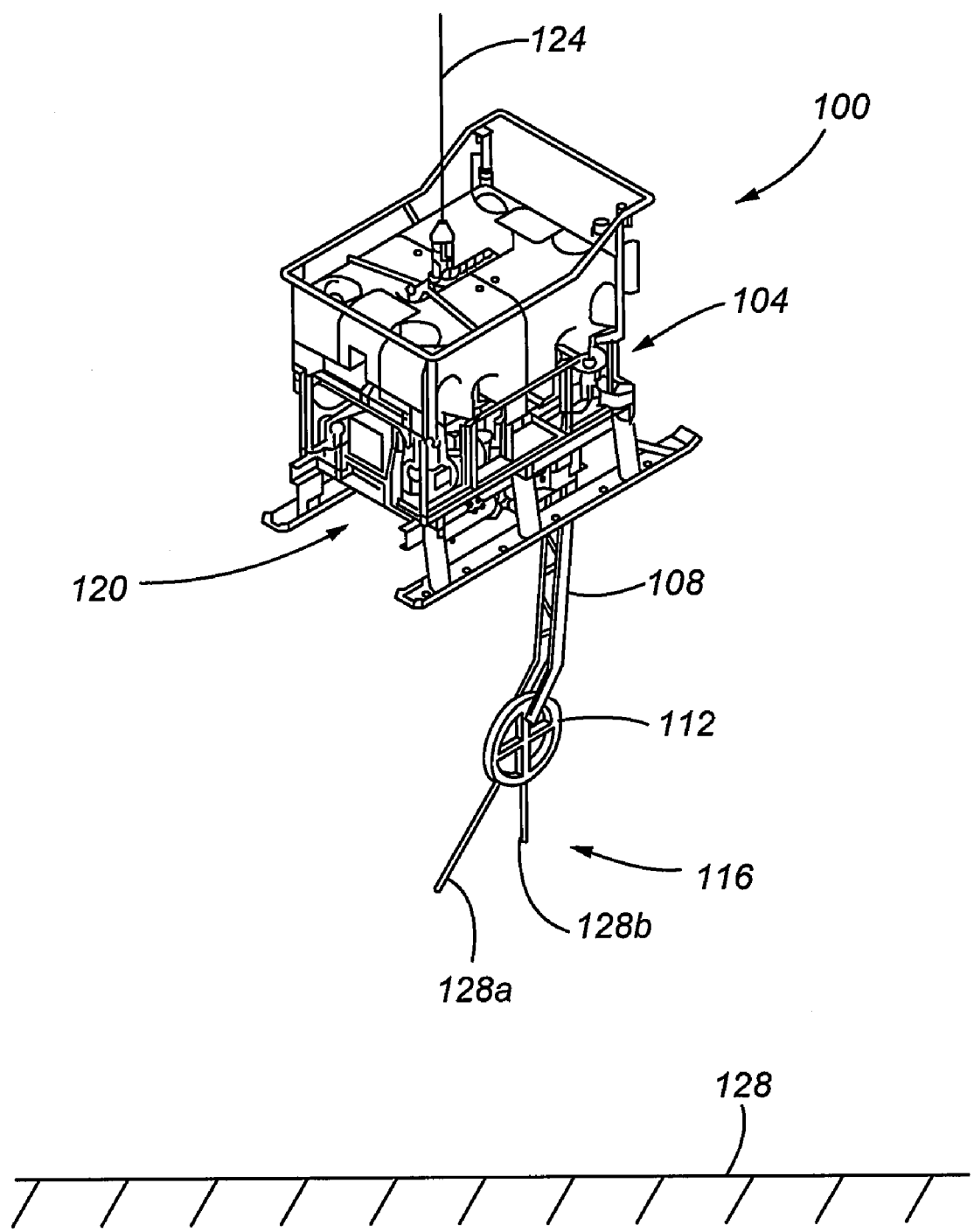
FIG. 1 is a perspective view of a geophysical system according to an embodiment.

With reference to FIG. 1, an embodiment of the system will be discussed.

The system 100 comprises a modified submersible Remotely Operated Vehicle ("ROV") 104 in spatial proximity to the ocean floor 128. The ROV 104 includes, inter alia, an extendible and retractable arm 108 mounting a transmitter coil 112, electromagnetic sensor 116, electronics package 120, and umbilical 124 connecting the ROV 104 to a surface vessel (not shown).

The ROV 104 can have any design suitable for the specific underwater application. It may have on-board intelligence, making it partly or fully automated. Thus, the system can be deployed as an Autonomous Underwater Vehicle (AUV), so that one or more systems can be deployed at the same time in an unattended mode of operation.

The extendible and retractable arm 108 may have any suitable configuration. The arm 108 may, for example, be telescopically extendible, rotated into position about a rotatable joint or hinge, a pantograph structure (shown in FIG. 5), a rigid frame moved into position by a suitable mechanism, and/or a fixed, non-moving structure.

The transmitter coil 112 is oriented with its windings substantially vertical, and can have any suitable shape, such as circular (shown), rectangular, trapezoidal or other polygonal shape, or elliptical, and is formed of single or repeated windings of an insulated electrical conductor. The insulated exterior coating of the conductor inhibits the direct passage of electrical current into the surrounding, electrically conductive water. The transmitter coil 112 may be energized with a time varying or time invariant current waveform. In one configuration, the current is a time varying waveform having a variable frequency content.

The size of the transmitter coil 112 is directly related to the volume of investigation. By way of example, the larger the coil 112 the larger the volume of investigation, and the smaller the coil 112 the smaller the volume of investigation. Stated another way, the size of the coil 112 is directly related to the maximum stand off distance the coil 112 may be from the ocean floor 128 and still perform effective resistivity/conductivity measurements of the floor 128. Preferably, the coil is relatively compactly sized relative to conventional geophysical transmitter coils. Although the maximum desirable stand off distance between the ocean floor 128 and the coil 112 is a function of the skin depth in the ocean, the transmitted waveform frequency, and the noise floor on the receiver circuitry, the maximum desirable stand off distance between the ocean floor and coil when ocean floor resistivity measurements are taken preferably is no more than about 10 times the diameter of the coil and even more preferably no more than about 5 times the diameter of the coil.

The electromagnetic sensor 116 senses ambient Electric vector ("E") fields and/or magnetic vector ("H") fields. In one configuration, the sensor 116 measures H-field and is any suitable H-field sensor, such as one or more series-connected magnetic coils mounted on a core, other coil designs, magnetoresistive sensors including Wheatstone circuits, and fluxgate magnetometers. While not wishing to be bound by any theory, reciprocity theory holds that a time varying electric field produced by an electric dipole, such as an electric dipole exciter (if used instead of a magnetic field transmitter such as the coil 112) will produce a corresponding magnetic field that can be measured using a magnetic field sensor in place of an e-field sensor to infer the conductivity structure of the ocean bottom. Magnetic field sensors can measure both the static and/or dynamic magnetic field(s). In one configuration shown in FIG. 1, the sensor 116 measures the E-field and includes a pair of spaced-apart first and second electrodes 128a-b extending downwardly from the ROV 100. As will be appreciated, other electrode configurations are possible. The electrodes measure, in one implementation, the induced electric field in the surrounding water. In this implementation, the measured ambient induced voltages are related to the electric current energizing the transmitter coil 112. The electric field measurement allows the current density to be determined because the conductivity of the water can be estimated. Measuring the current density in the water above the bottom and knowing the geometry of the sensor and the ocean bottom, and their relative locations enables the system to measure the complex apparent resistivity of the ocean bottom or sub-ocean environment, including the induced polarization and cole-cole parameters. If the locations and geometry are not well known, it is still possible to infer whether the bottom is relatively electrically conductive or electrically resistive or if the complex apparent resistivity parameter is anomalous considering relative changes in current density.

The relative orientations of the transmitter coil 112 and first and second electrodes 128a-b can provide unexpected benefits relative to conventional geophysical devices. The first and second electrodes 128a-b are substantially coplanar with, and located below, the coil 112, or, stated another way, the plane of the first and second electrodes 128a-b is parallel with, and preferably the same as, the plane of the coil 112. Relative to the ocean floor 128, the plane(s) of the coil 112 and first and second electrodes 128a-b are vertically disposed and, in one implementation, substantially normal to the plane of the ocean floor 128. So oriented, the coil 112 provides a substantially horizontal magnetic dipole, which is substantially parallel to the ocean floor 128.

In one configuration, the sensor includes a second sensor in a plane normal to the plane of the transmitter coil and coplanar sensor. For example, when the sensor is configured as an electrode pair, a first electrode pair is in the plane of the coil and a second electrode pair in a plane orthogonal to the plane of the coil. The second electrode pair can provide asymmetric electromagnetic information.

While not wishing to be bound by any theory, the coil 112 and sensor 116 can be considered as a modification of a 4-probe resistivity array in which an in-water, towed 4-probe resistivity array is excited by current electrodes and voltage electrodes are used for sensing. The excitation electrodes are replaced by an AC-powered coil 112 whose major axis is oriented horizontally. This coil 112 generates an electromagnetic field with a component current (J-Field) surrounding the coil 112 in the plane of the coil windings. Voltage-sensing electrodes 116 are located below the coil to measure voltage parallel to the coil windings. Because seawater is conductive, the magnitude of the current field remains significant as the distance from the coil 112 increases. Because the conductivity of seawater is very constant, one can predict the spatial and magnitude relationships between the generated electromagnetic field and the induced current field in open water. As with a standard 4-probe resistivity array, the voltage sensors 116 measure the voltage caused by the current field (J-Field) in the seawater. Because the coil's primary axis is oriented horizontally, part of the induced current field is directed downward into the ocean floor 128. The presence of a conductor or insulator below the coil 112 changes the local resistivity and causes distortion in the electromagnetic field. Distortion in the electromagnetic field results in changes in the voltage measured across the voltage-sensing electrodes.

The operation of the coil and sensor will be further discussed with reference to FIGS. 2-4. These examples show that the distribution of electric current around the coil 112 is a function of the distribution of the conductivity structure around the coil, the transmitter coil geometry, and the time-varying electric current in the coil.

Figure 2:
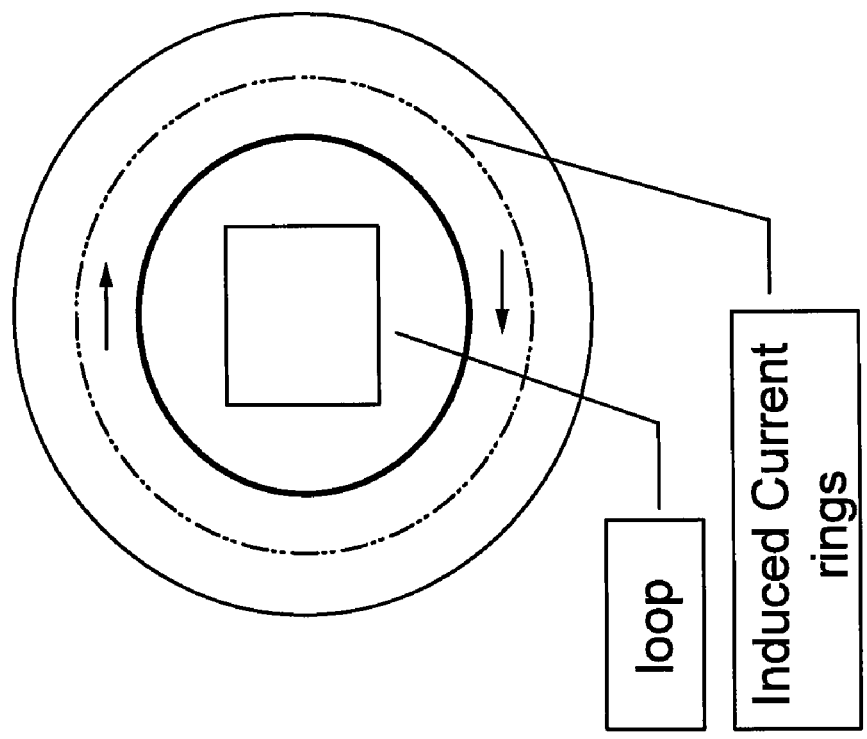
FIG. 2 depicts transmitted electromagnetic energy according to an embodiment.

As shown in FIG. 2, the coil 112 (which is shown as being rectangular), when energized with an electrical current, forms a magnetic field, which induces electrical currents to flow around the coil in the plane of the coil. The amplitude and phase distribution of the induced current is a function of the conductivity of the medium that the induced current is circulating in. In the absence of interfering structures, the current flow is normally substantially symmetric, both in shape and magnitude, around the coil 112.

Figure 3:
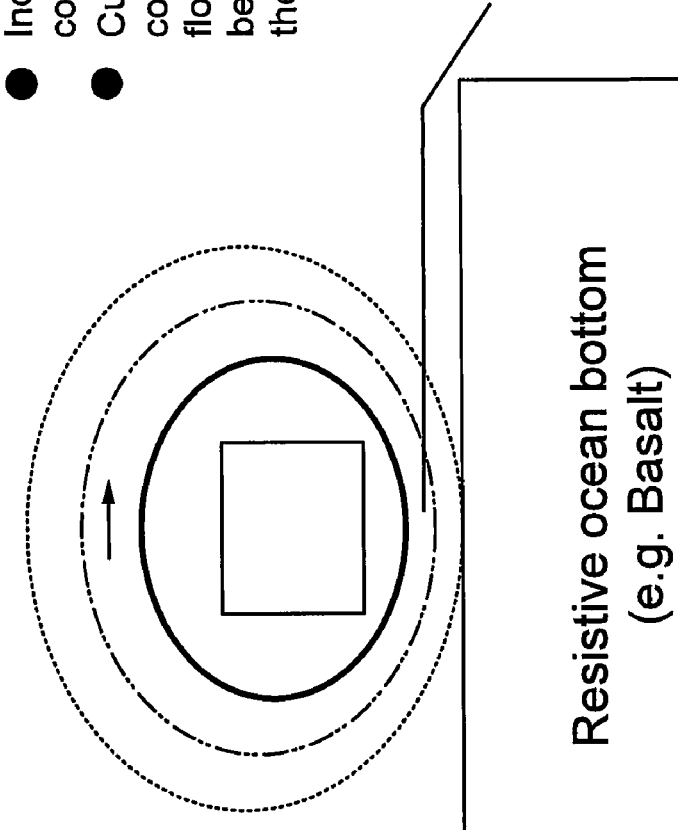
FIG. 3 depicts transmitted electromagnetic energy according to an embodiment.

As shown in FIG. 3, the coil 112 is now in close spatial proximity to a resistive ocean bottom 128 (such as basalt). The bottom 128 has a higher resistivity than water. When energized, the coil 112 induces electrical currents to flow around the coil in the plane of the coil. However, unlike the prior example the electrical current density in the water below the coil 112 is anomalously high, and different from the current density at other locations around the coil, as electrical current flows preferentially in the water. Water is more conductive than the resistive ocean bottom. Stated another way, the horizontal E field between the coil 112 and bottom 128 is higher than it would be in water alone and at other locations around the coil.

Figure 4:
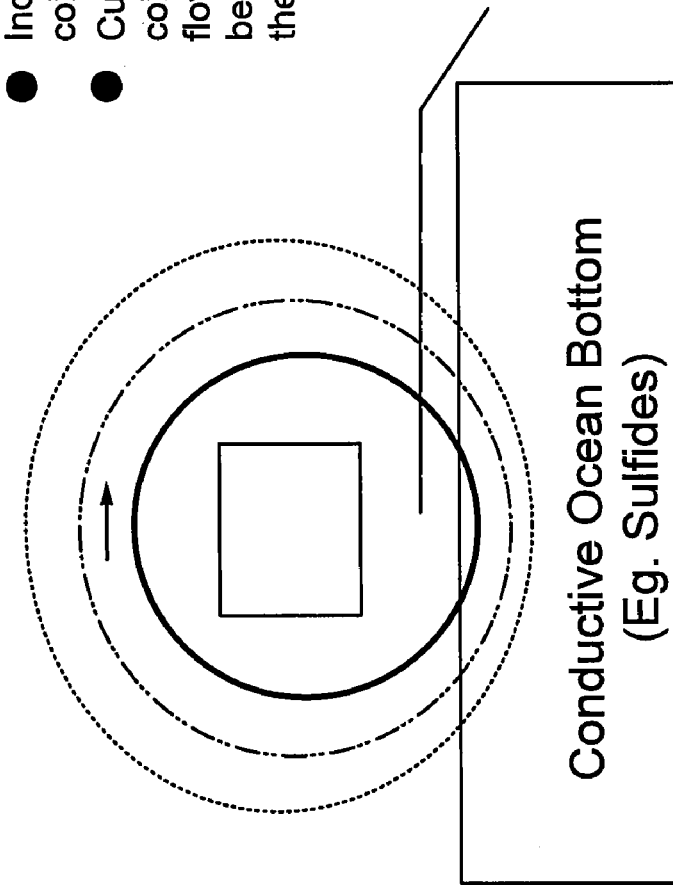
FIG. 4 depicts transmitted electromagnetic energy according to an embodiment.

As shown in FIG. 4, the coil 112 is now in close spatial proximity to a conductive ocean bottom 128 (such as sulfides). The conductivity of the bottom 128 is higher than that of water. When energized, the coil 112 induces electrical currents to flow around the coil in the plane of the coil. However, unlike the prior example the electrical current density in the water below the coil 112 is anomalously low, and different from the current density at other locations around the coil, as electrical current flows preferentially in the sulfides. Water is less conductive than the conductive ocean bottom. Stated another way, the horizontal E field between the coil 112 and bottom 128 is lower than it would be in water alone and at other locations around the coil.

As can be seen from these examples, the electric current induced by the coil is in the plane of the coil. Accordingly, the electric current is optimally measured by first and second electrodes positioned in the plane of the coil.

Returning to FIG. 1, the electronics package 120 and umbilical 124 are discussed in detail below.

To avoid interference with the sensor's measurements, the other components of the ROV are selected with consideration of the electrical properties of the components when the ROV is deployed. For example, electrically conducting parts of the ROV can influence sensor measurements when they are in the region of induced circulating currents, and these conducting parts are taken into account when making the measurement (discussed in more detail below).

Other Geophysical System Designs

The geophysical system may have a myriad of other designs.

Figure 5:
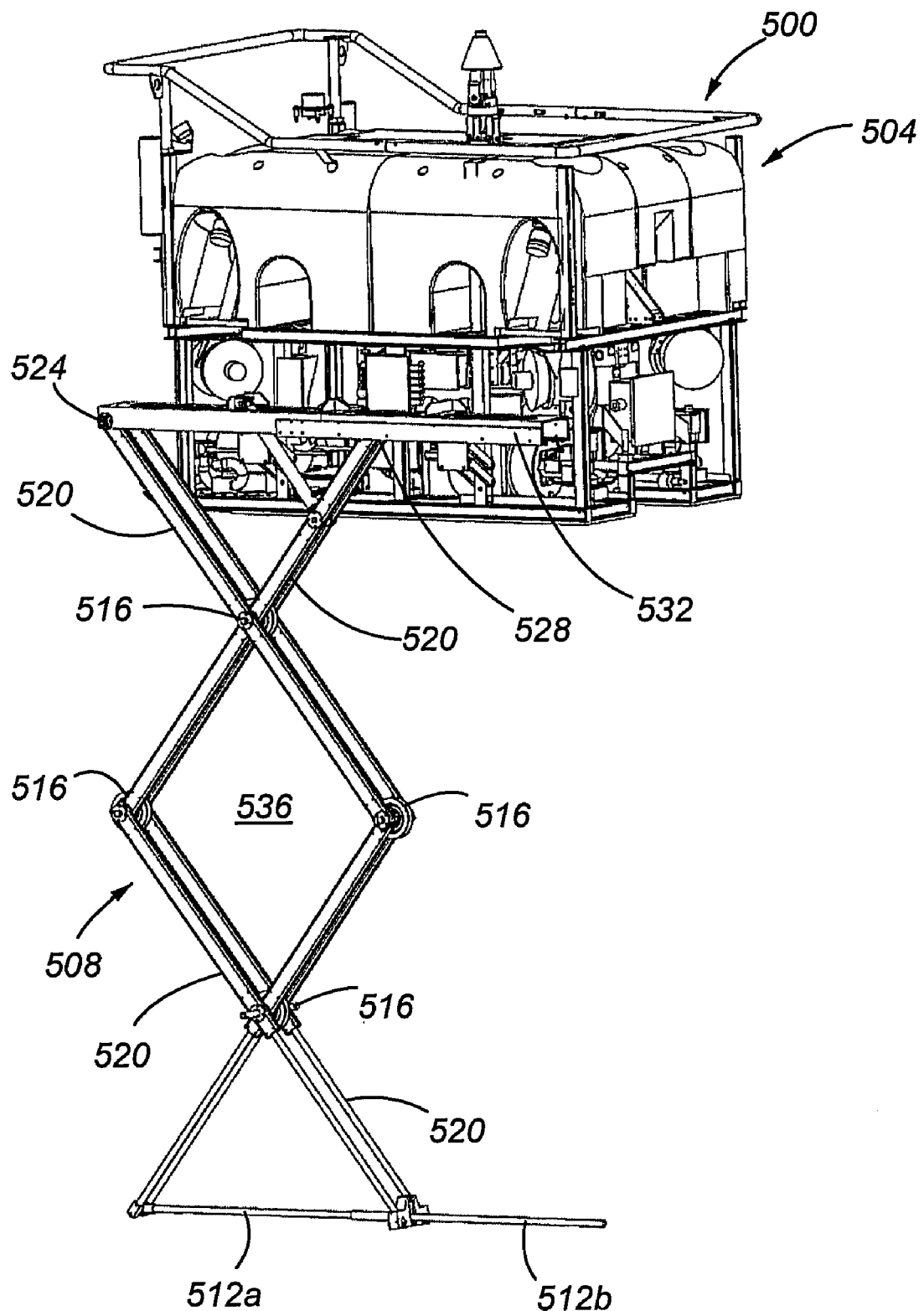
FIG. 5 is a perspective view of a geophysical system according to an embodiment.
Figure 6:
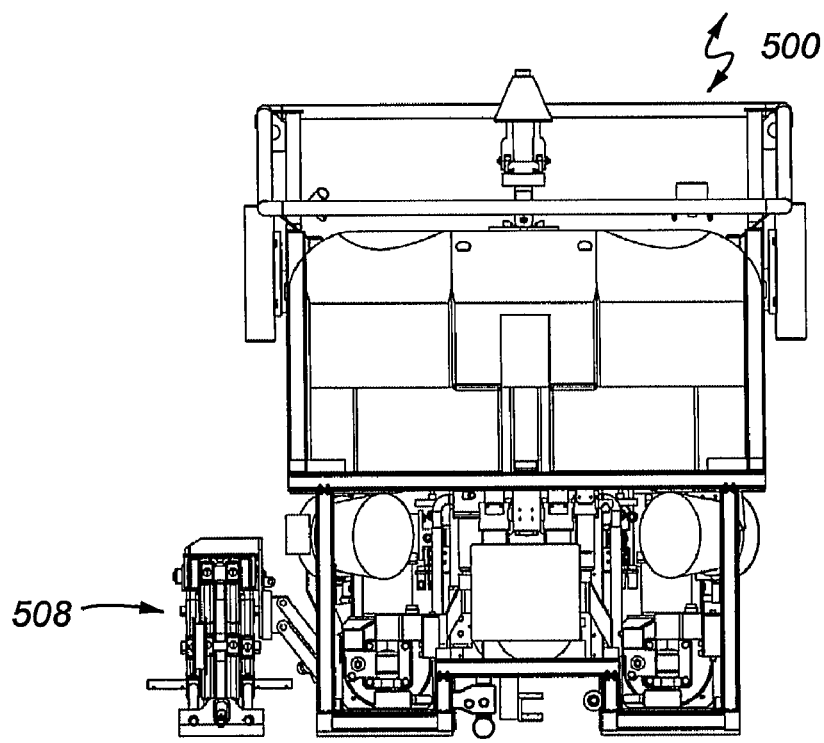
FIG. 6 is a rear view of the geophysical system of FIG. 5.
Figure 7:
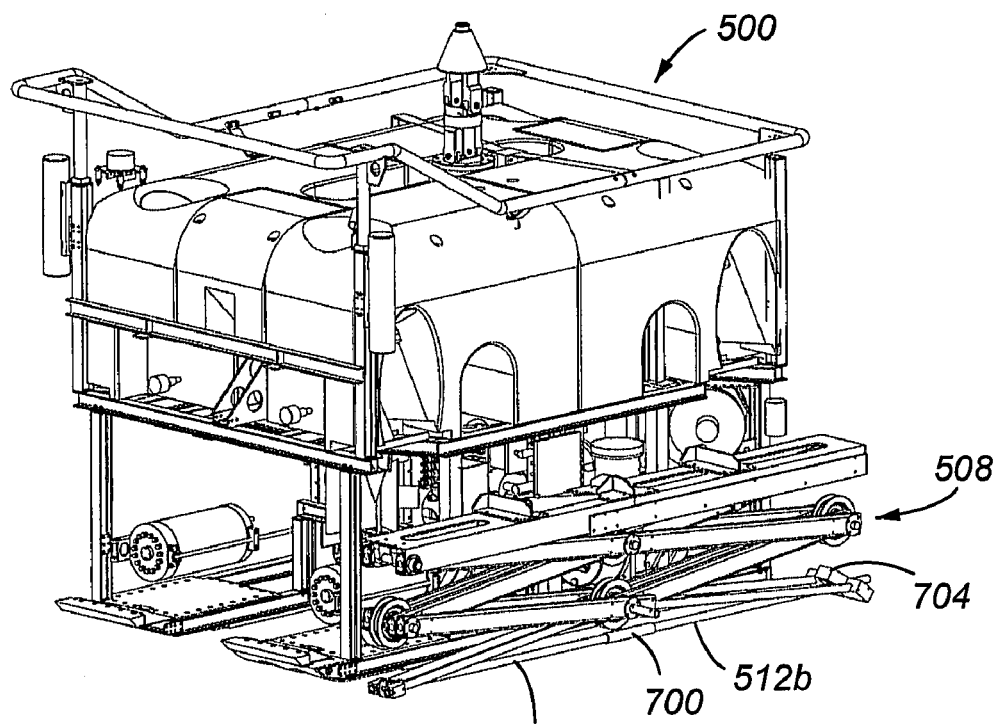
FIG. 7 is a perspective view of the geophysical system of FIG. 5.

With reference to FIGS. 5-7, a geophysical system 500 according to another embodiment is shown. The ROV 504 includes an extendible arm 508 in the form of a pantograph and first and second sensor electrodes 512*a,b* positioned at the bottom of the arm 508. As will be appreciated, a pantograph is a truss-like structure having a rotatable hinge 516 at the junction of each truss member 520 The upper ends of the members 520 are either rotatably hinged 524 or slidably engaged 528 in a channel 532. The transmitter coil is formed by conductive windings (not shown) positioned on the members 520 adjacent to and surrounding region 536. FIGS. 6-7 are different views of the system 500 with the arm 508 retracted fully. FIG. 7 shows an insulating sleeve 700 engaging and separating the collinear first and second electrodes 512*a,b* and the slidable engagement of the electrode 512*b* with the end 704 of the member 520.

Figure 11:
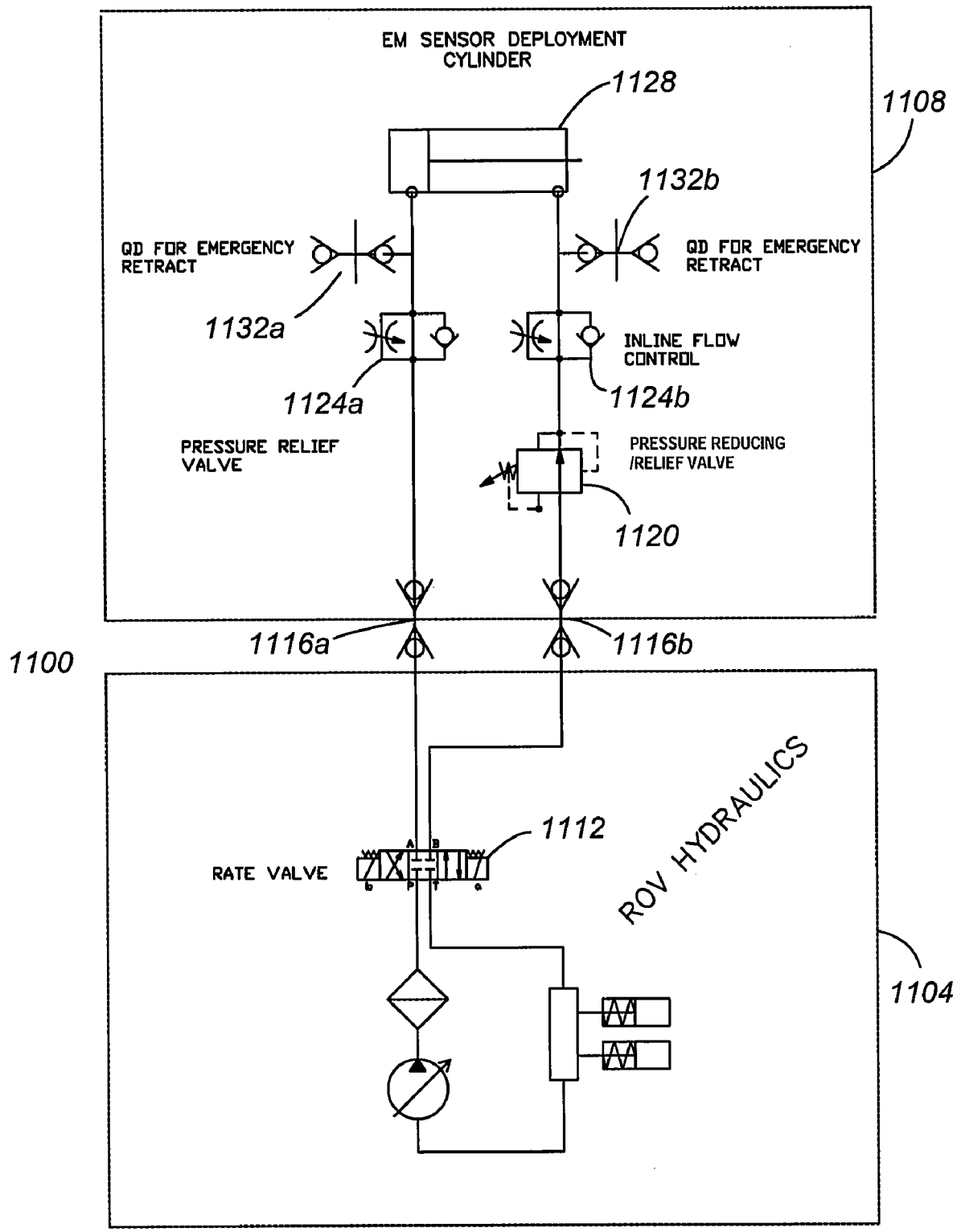
FIG. 11 is a block diagram of the hydraulic interface according to an embodiment.

FIG. 11 is a block diagram of a hydraulic interface 1100 used to deploy the arms 108 and 508 using a single hydraulic function. The interface 1100 includes ROV hydraulic assembly 1104 and arm hydraulic deployment assembly 1108. The ROV hydraulic assembly 1104 includes a four-way rate valve 1112 positioned between the arm hydraulic deployment assembly 1108 and other components of the ROV hydraulic assembly 1104. The assembly 1108 includes first and second (quick disconnect) interface fittings 1116*a,b*, pressure reducing/relief valve 1120 to protect the arm structure members if pushed against a solid object (e.g., seafloor) while it is being deployed, first and second inline flow control valves 1124*a,b* to permit operators to control manually the speed of arm deployment and storage, hydraulic cylinder 1128, and first and second quick disconnect fittings 1132*a,b* for emergency retraction. As will be appreciated, the hydraulic cylinder 1104 is operably engaged with the arms and expands to extend and deploy the arm and contracts to retract the arm in response to pressurization and depressurization, respectively, of the hydraulic lines.

Figure 8:
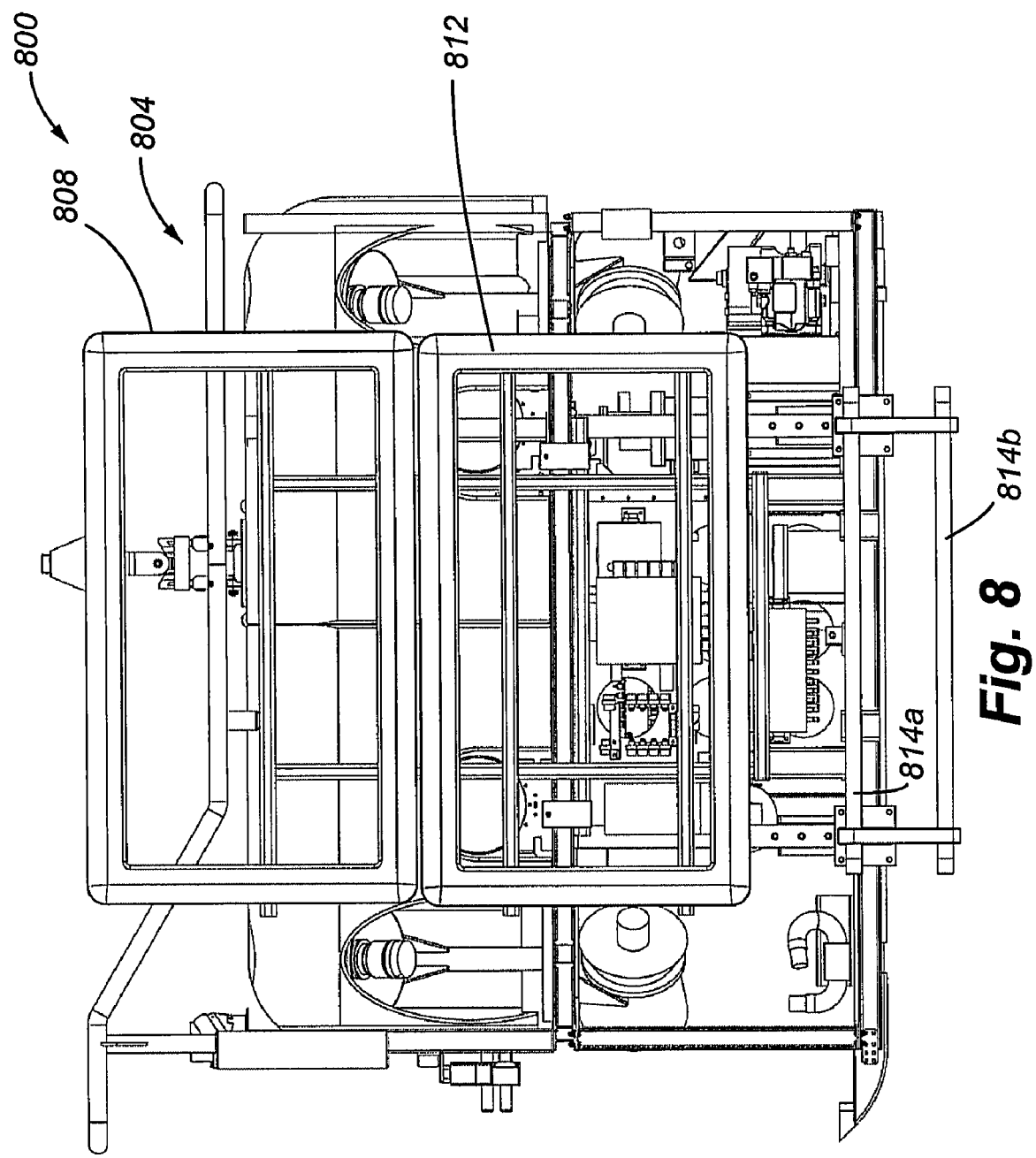
FIG. 8 is a side view of a geophysical system according to an embodiment.
Figure 9:
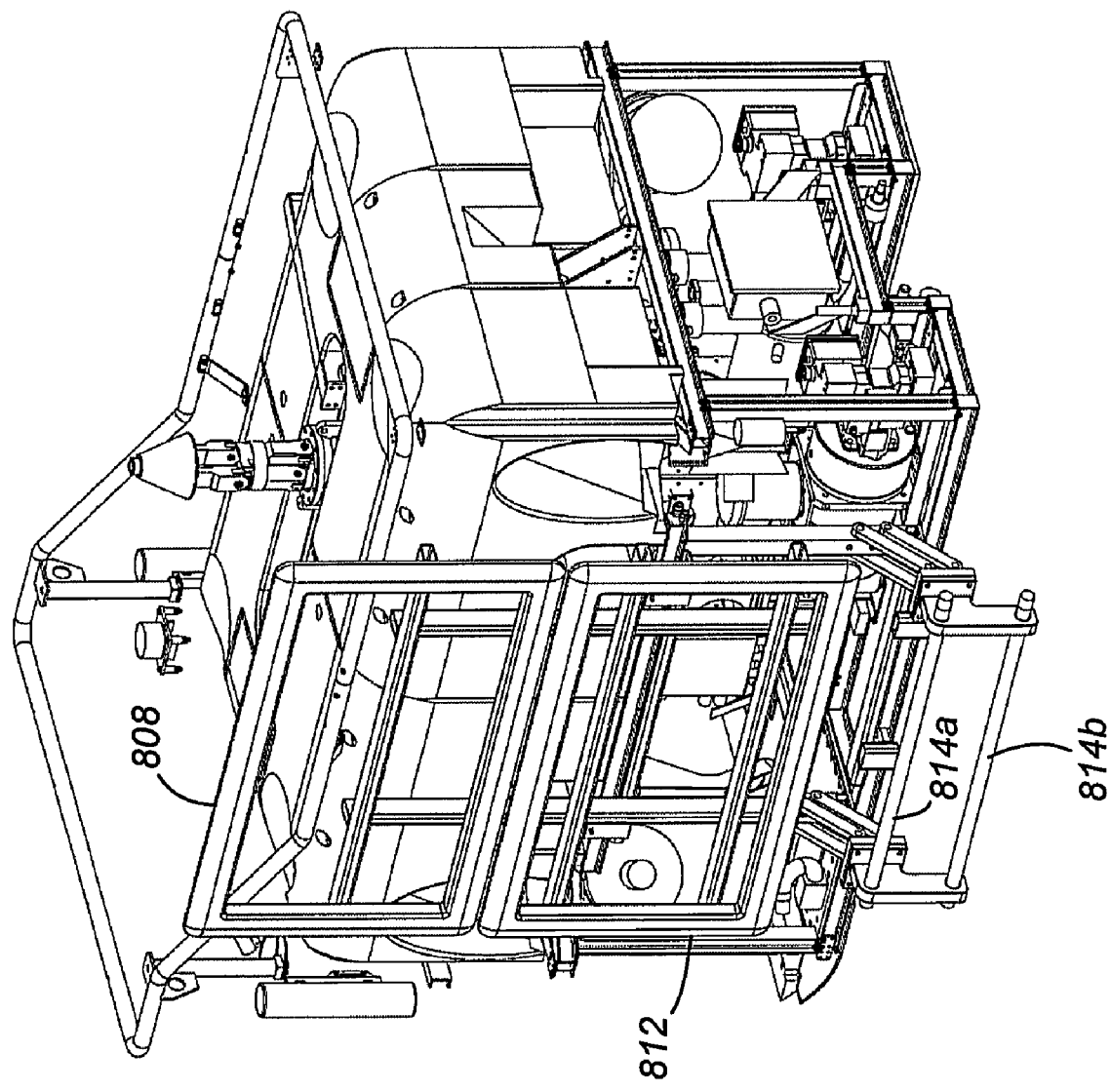
FIG. 9 is a perspective view of the geophysical system of FIG. 8.
Figure 10:
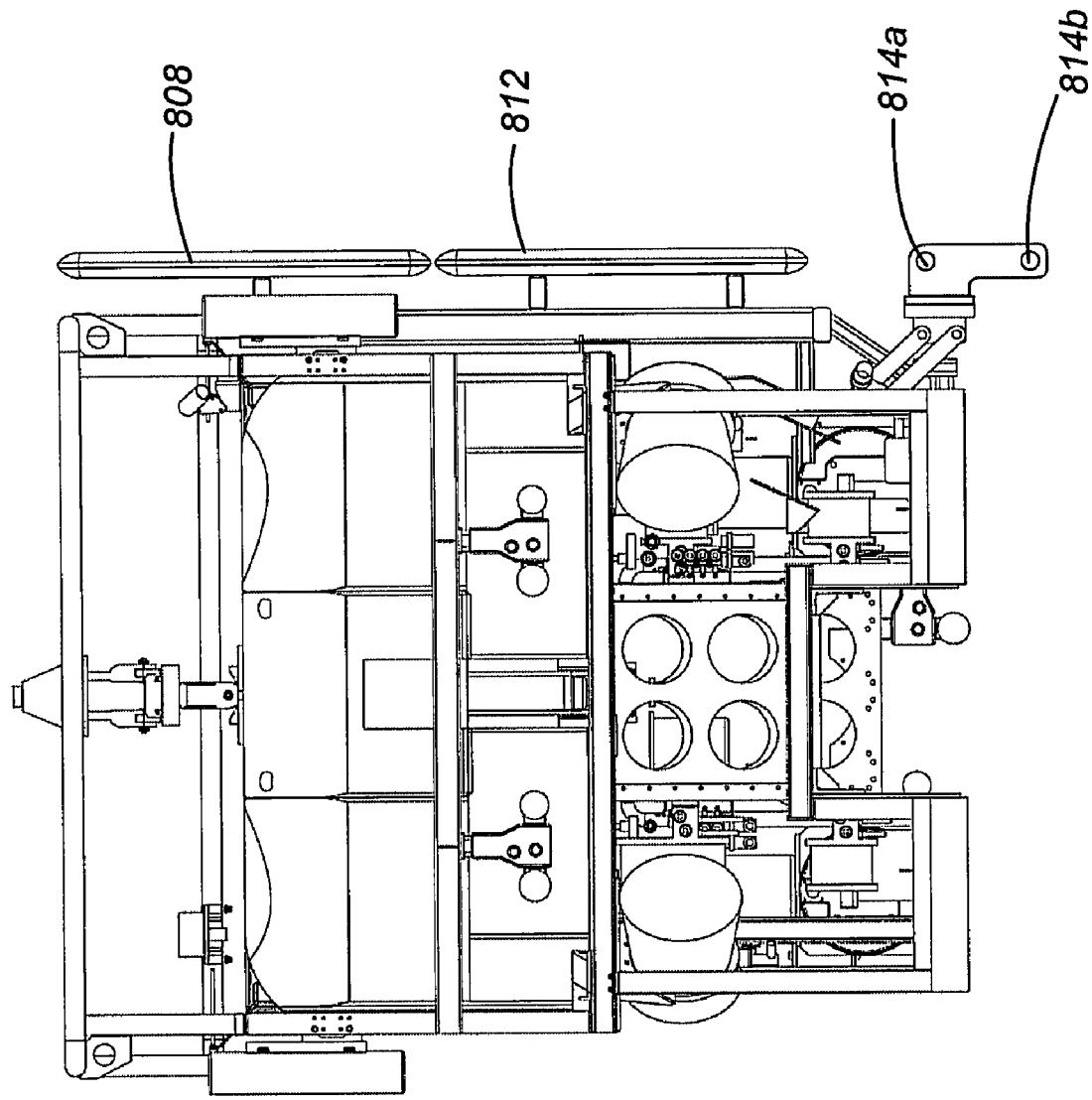
FIG. 10 is a front view of the geophysical system of FIG. 8.

With reference to FIGS. 8-10, a geophysical system 800 according to another embodiment is shown. While the above embodiments positioned the coil/sensor assembly well below the ROV to reduce the electromagnetic noise from the ROV and due to concerns regarding adverse influences by the coil 112 on navigation and video equipment operation, this positioning may not be required in many implementations. The ROV 804, like the prior embodiments, includes first and second vertically spaced apart transmitter coils 808 and 812 positioned above first and second electrodes 814*a,b* but, unlike the prior embodiments, the coils 808 and 812 and first and second electrodes 814*a,b* are rigidly attached to the frame of the ROV 804. The advantages of this mounting arrangement include the coil and sensor are much less vulnerable when positioned close to the vehicle and the ROV operator does not need to be as vigilant about avoiding collisions with objects far below the vehicle The coil and sensor are more portable, making them simpler and less expensive to mobilize in remote destinations.

The coplanar orientations of the first and second coils 808 and 812 and first and second electrodes 814*a-b* are well illustrated in FIG. 10. As can be seen in FIG. 10, a longitudinal plane of symmetry of each of the coils 808 and 812 (which is orthogonal to the horizontal axes of symmetry of the coils) is substantially coplanar with a plane defined by the first and second electrodes 814*a-b*.

The use of multiple coils permits multiple channels of data to be recorded simultaneously or in close sequential series to improve the interpretability of the data. This might include different geometries of e-field sensors or transmitter coils, or multiple transmitter coils or transmitter frequencies. For example, using two transmitter coils, with the coils oriented one above the other in the vertical plane and by alternately energizing the coils (e.g., time-sharing the excitation coils, driving first one, then the other, with the same amplifier) with electricity can enable the conductive or resistive nature of the ocean bottom to be determined unambiguously. The system response when approaching the bottom is characteristic of the conductivity contrast of the bottom with respect to the ocean conductivity. The alternate use of two coils at different heights off the bottom allows the simulation of the transmitter coil approaching the bottom without the platform the system is mounted necessarily being moved up and down in the water. In other words, this coil arrangement emulates the effect of seeing the electrode voltage change upon approaching or departing from the ocean floor 128 and eliminates the requirement for "dipping" (discussed below).

In one configuration, first and second pairs of sensor electrodes are positioned below both of the spaced-apart coils. The vertical distance between the adjacent surfaces of the first and second pairs of sensor electrodes is substantially the same distance as the vertical distance separating the adjacent surfaces of the coils. While alternatively energizing the first and second coils, measurement signals are received from the first and second outputs corresponding to the first and second pairs of electrodes. In open water, the first and second electrode pairs should observe substantially the same conductivity. However, when the electrodes are close to a conductive bottom, the lower, second electrode pair should see a lower resistivity (lower voltage) than the upper, first electrode pair. When close to a resistive bottom, the lower second electrode pair should observe a higher resistivity (higher voltage).

In other configurations, first and second pairs of electrodes are not at the same vertical separation as the first and second vertical coils. The differing distances are accounted for by calibrating the system response to get the same result with the different vertical separations.

In other configurations, the first and second coils are concurrently excited to generate an additive electromagnetic field.

In other configurations, the first and second coils are excited simultaneously using different frequencies, thereby separating the responses into the two different frequencies. In this way, there is no need to time-share between the first and second coils.

In other configurations, the first and second coils are mounted such that their horizontal magnetic axes are orthogonal to each other, thereby allowing any directional variations in ocean floor resistivity to be detected.

In other configurations, one or more coils are mounted on each side of the subsea vehicle or platform, thereby allowing the system to further distinguish variations in bottom resistivity.

In other embodiments of the geophysical system, one or more transmitter coils and one or more sensors are towed behind a surface or submersed vessel.

In other embodiments of the geophysical system, the coils and sensors are physically separated and carried by different vessels, one of the coils or sensors is fixed while the other of the coils or sensors are moved, or the coils and sensors occupy stationary positions to take spot readings. This is in contrast to the above embodiments in which the coil and sensor are fixed in relation to one another and moved concurrently over the ocean bottom to complete a series of measurements.

The Functional Components of the Geophysical System

Figure 12:
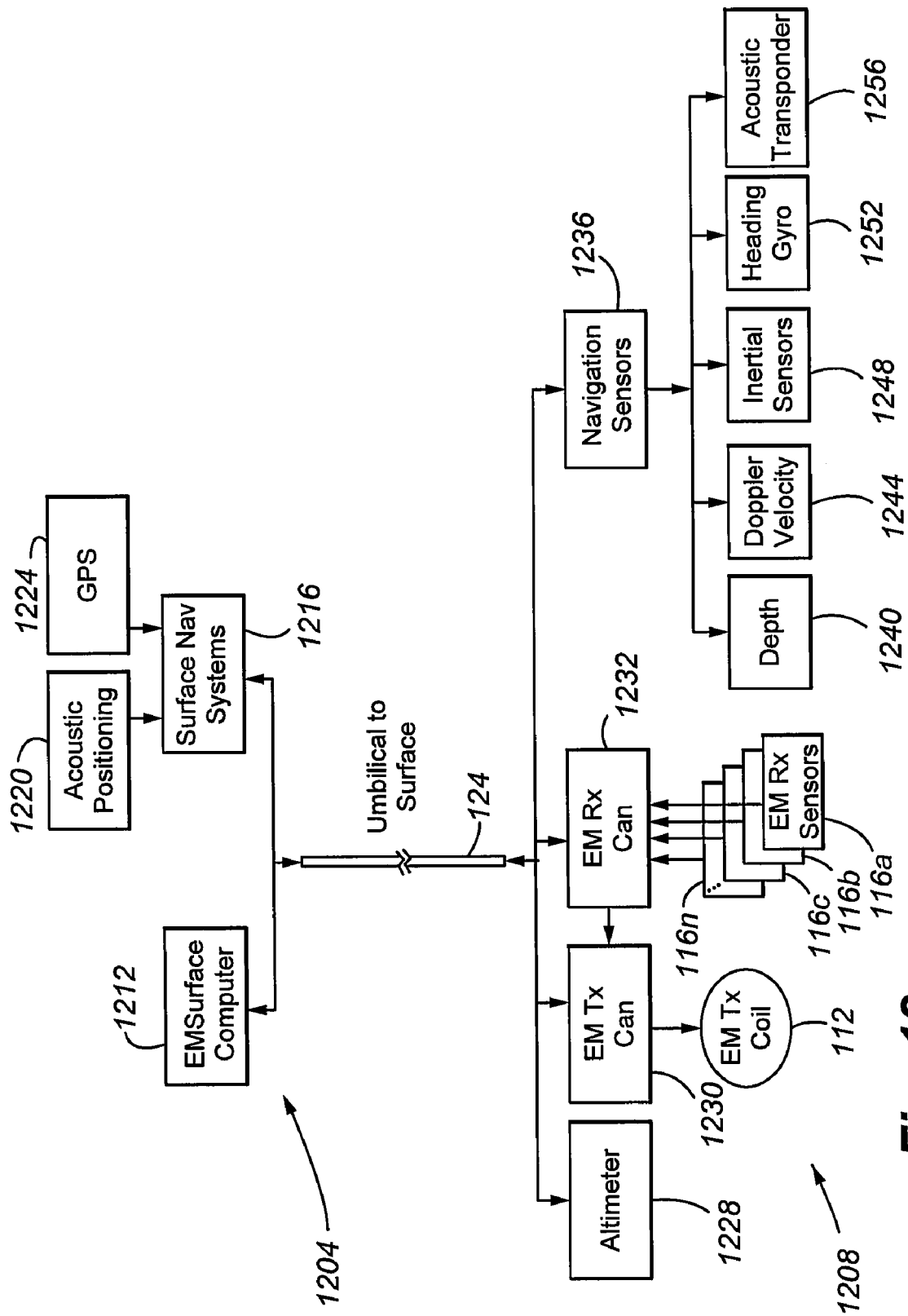
FIG. 12 is a block diagram of the functional components of the geophysical system according to an embodiment.

FIG. 12 is a block diagram of the system according to an embodiment. The block diagram includes a first assembly 1204 positioned at the surface on a surface vessel (not shown) and the ROV assembly 1208 positioned beneath the surface. As discussed below, the first and second assemblies can operate in the frequency and/or time domains and can extract information from the received data stream that includes the complex response of the environment to the transmitted waveform, such as, for example, apparent resistivity, induced polarization effects (e.g., chargeability and/or complex parameters including the real and imaginary components of the response which define the cole-cole parameters describing the ocean floor or sub-ocean environment).

The first assembly 1204 includes an EM surface computer 1212, a surface navigation system 1216, and acoustic positioning and geosynchronous satellite positioning modules 1220 and 1224, respectively.

The EM surface computer 1212, which is discussed in detail below, communicates with the ROV assembly 1208, provides operator input/output functions, and provides real-time data processing. Exemplary data processing tasks include determining the magnitude and phase of the received electromagnetic sensor signals with respect to the transmitted waveform. These tasks are discussed in greater detail below.

The surface navigation system 1216 is an integrated computer system that determines, based on signals from the acoustic positioning module 1220, the position of the ROV assembly 1208 with respect to the surface vessel, combines that position estimate with the vessel position determined by the geosynchronous satellite positioning module 1224, and logs the raw and unprocessed data. In one configuration, the navigation system uses geosynchronous satellite-based coordinates, and navigation sensor information received from the second assembly 1208 and integrates it with measurements from the surface-vessel-based acoustic positioning module 1220. The acoustic positioning module 1220 can be any suitable device for locating the ROV assembly using acoustic signals, and the geosynchronous satellite positioning module 1224 any suitable sensor, such as a Global Positioning System (GPS) sensor, In one configuration, the acoustic positioning module 1220 is an ultra-short baseline unit. In another configuration, the acoustic positioning module 1220 is based on the ocean floor 128, and not on a surface vessel, and is a long baseline unit. A Kalman filter or similar algorithm is typically used to generate the estimate of ROV position.

The second assembly 1208 includes an altimeter 1228 (such as an acoustic multibeam sonar or acoustic altimeter) to determine the altitude of the ROV above the ocean floor 128, an electromagnetic transmitter canister 1230 operably engaged with the transmitter coil 112, an electromagnetic receiver canister 1232 operably engaged with a plurality of electromagnetic receiver sensors 116a-n, and a navigation sensor package 1236 to determine the position of the ROV with respect to the surface vessel. The package 1236 includes a depth sensor 1240, Doppler velocity sensor 1244 to determine the velocity of the ROV with respect to the ocean floor 128 and/or water column, inertial sensor 1248 to determine pitch, roll, angular rate and translational accelerations, heading sensor 1252 (such as a fiber-optic gyroscope), and acoustic transponder or responder 1256 to communicate with the surface-based acoustic positioning system. As will be appreciated, the various sensors can be any suitable sensor for collecting the desired measurements.

The electromagnetic transmitter canister 1230 is an underwater canister-type housing, which contains the power amplifiers to drive the electromagnetic (EM) coils 116. Conventional high-power audio amplifiers are suitable for this application. The "audio" signal input to the amplifier(s) preferably comes from a waveform generator in the computer in the receiver canister 1232. As noted, the coil 116 generates the electromagnetic fields which penetrate the sea bottom. In one configuration, only one coil 116 is used. In other configurations, multiple coils 116 are used. In a preferred configuration, first and second coils, positioned one above the other, are used. This configuration allows the system to emulate the effect of "dipping" or moving toward and away from the bottom without changing the altitude of the platform.

The electromagnetic receiver canister 1232 contains the sub-ocean data acquisition and real-time processing equipment. This equipment includes high resolution analog-to-digital converters to input signals from the receiver sensor(s) 116. It also communicates with the EM surface computer 1212, receiving commands from and providing data to the first assembly.

Figure 14:
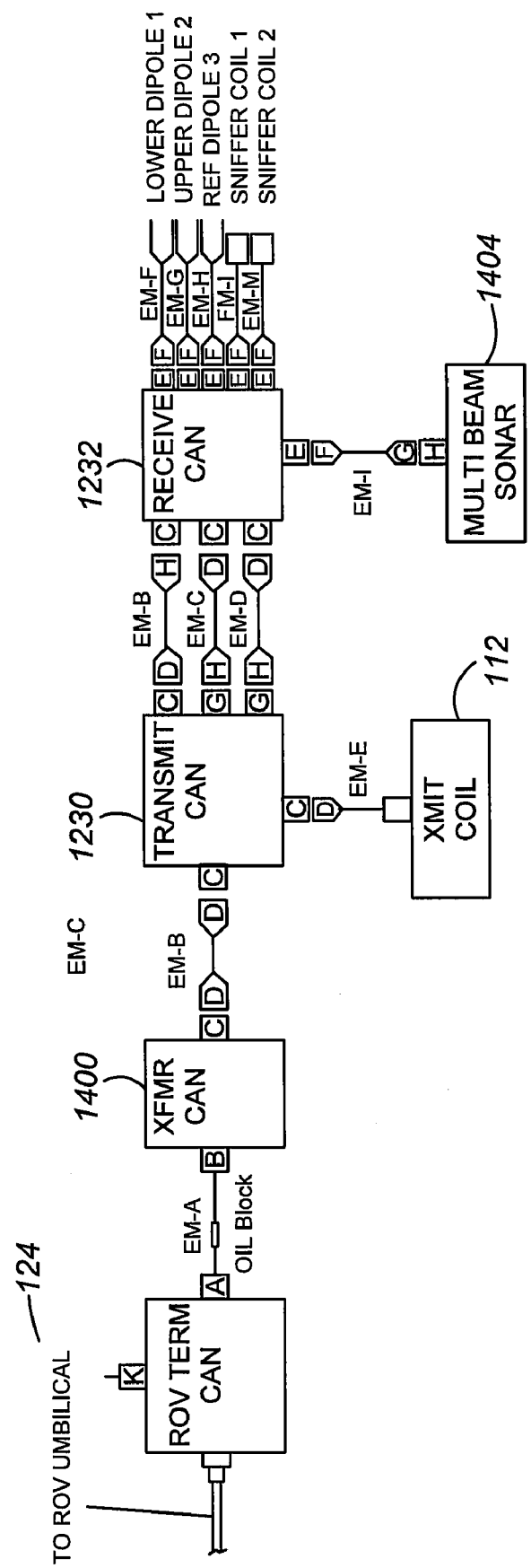
FIG. 14 is a block diagram of cabling according to an embodiment.

FIG. 14 depicts an embodiment of the electrical interface between the various components in the transmit and receiver canisters 1230 and 1232. The interface includes a transformer canister 1400, which houses a three phase step-down transformer with a 220 V center-tapped, data connected secondary. The secondary windings are rated for 15 kVA at 200 V three-phase output or 7.5 kVA at 110 V three-phase output. Both the receiver and transmitter canisters are powered from the transformer canister 1400. The receiver canister provides power to a multibeam sonar sensor 1404. An ROV termination canister 1408 provides an electrical interface between the components of the transformer canister 1400 and the umbilical 124.

Figure 13:
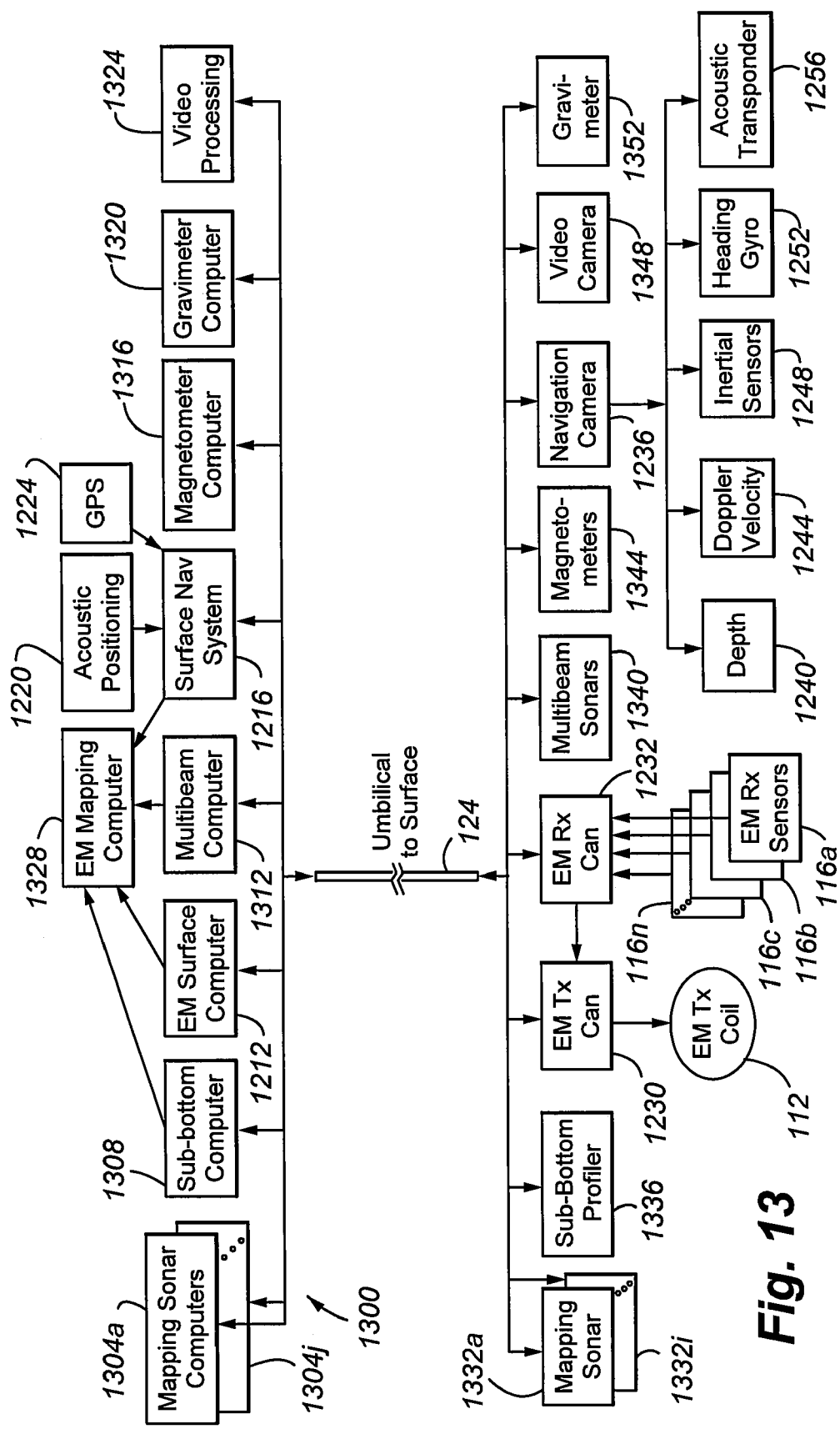
FIG. 13 is a block diagram of the functional components of the geophysical system according to an embodiment.

FIG. 13 is a block diagram of the system according to an embodiment. This embodiment is similar to the prior embodiment except that the first and second assemblies include a number of additional components.

The first assembly 1300 includes, for example, a plurality of mapping sonar computers 1304a-j, a sub-bottom computer 1308, a multibeam computer 1312, a magnetometer computer 1316, a gravimeter computer 1320, and a video processing module 1324. The various components provide data to the EM mapping computer 1328.

The mapping sonar computers 1304a-j process data from the mapping sonar(s) 1332a-i, provide displays and controls for the operator, and log the raw and processed data.

The sub-bottom computer 1308 processes data from the sub-ocean sub-bottom profiler 1336, estimates the depth of silt covering the ocean bottom (optional), provides displays and controls for the operator, and logs the raw and processed data.

The multibeam computer 1312 processes data from the sub-ocean multibeam sonar(s) 1340, estimates the contour of the ocean bottom, provides displays and controls for the operator, and logs the raw and processed data.

The magnetometer computer 1316 processes data from the sub-ocean magnetometer(s) 1344, estimates the local magnetic field, provides displays and controls for the operator, and logs the raw and processed data.

The gravimeter computer 1320 processes data from the sub-ocean gravimeter 1352, estimates local gravity anomalies, provides displays and controls for the operator, and logs the raw and processed data.

The video processing module 1324 includes display, logging, and (optionally) filtering, augmentation, feature extraction, relative velocity estimation.

Figures 18, 19:
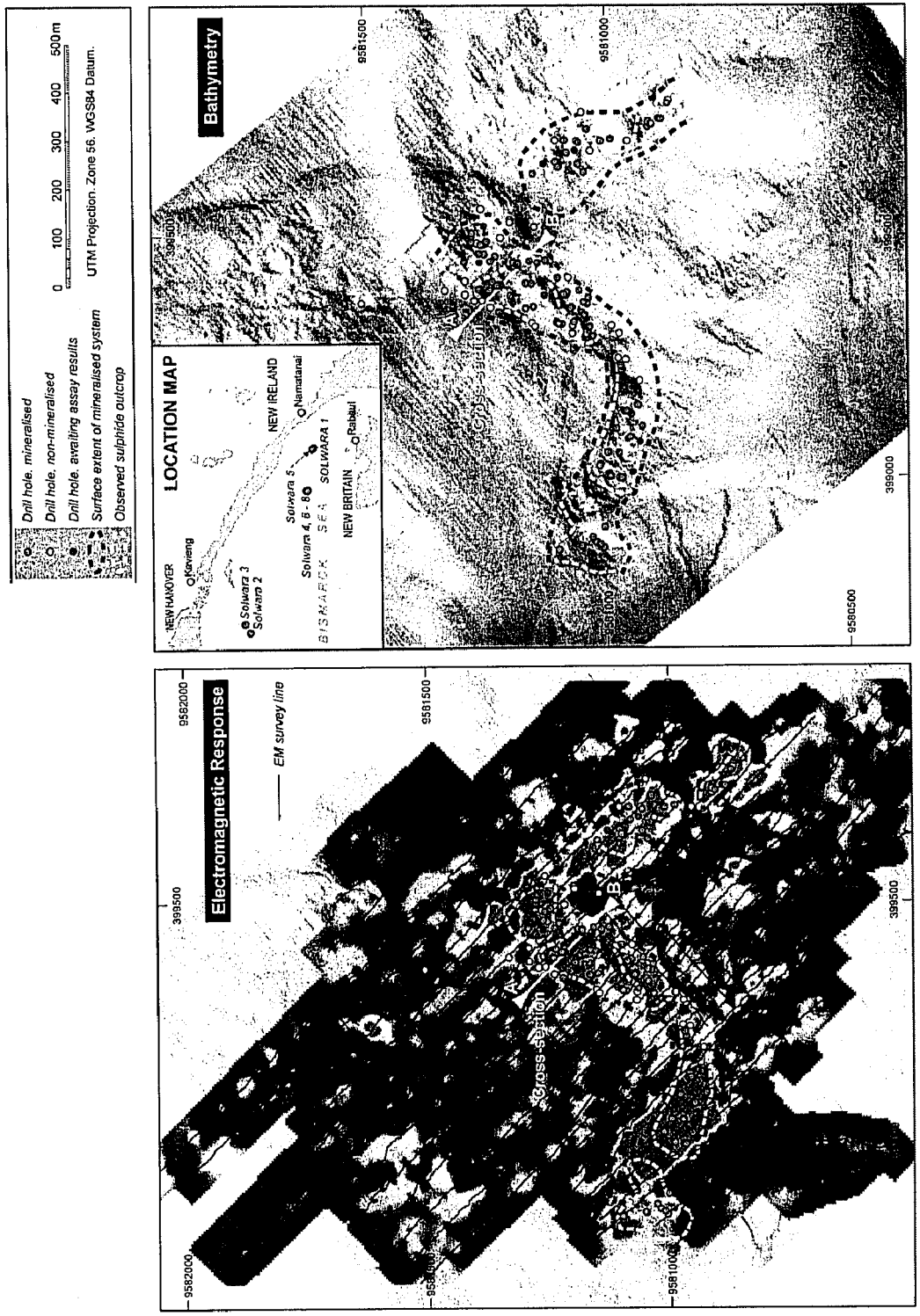
FIG. 18 is a map depicting the electromagnetic response of a sub-sea structure.
FIG. 19 is a map depicting bathymetry and drilling results of the same sub-sea structure.

The EM mapping computer 1328 receives data from the time synchronized sub-bottom computer 1308, surface computer 1212, multibeam computer 1312, and surface navigation system 1216 and generates maps displaying the survey results. To make this possible, all data is time stamped with reference to a common reference time. Examples of such maps are depicted in FIGS. 18-19 (discussed below).

The first assembly 1300 includes a plurality of mapping sonars 1332a-i, sub-bottom profiler 1336, multibeam sonars 1340, magnetometers 1344, video camera 1348, and gravimeter 1352.

The mapping sonars 1332a-i include sidescan sonars and forward-looking sonars. Forward-looking sonars are typically used by operators of sub-ocean vehicles to see objects in front of them that are beyond optical viewing distances. This sonar can be important to avoid potential collisions of the deployed arm with other objects, such as the ocean bottom. Sidescan sonars are typically used for feature mapping. They provide a wider swath than a multibeam sonar. These devices do not provide bathymetry information per se; instead, they provide reflectivity information, which may be indicative of bottom hardness and roughness. This information can be used to augment bathymetric maps. Data from these devices can be incorporated into mosaics for future viewing.

The sub-bottom profiler 1336 is a profiler that looks into the ocean floor and determines the amount of silt covering the hydrocarbon or mineral deposit of interest. This silt thickness can be added to the altitude reading to better estimate the conductivity of the ocean floor.

The multibeam sonars 1340 comprise one or more multibeam sonars that are used as altimeters and for bathymetric data acquisition. The sonars allow the geophysical system to make bathymetric maps as well as conductivity maps.

The magnetometer 1344 measure local magnetic anomalies. The data can be post-processed and "inverted" to generate maps of the local magnetic structure.

The video camera 1348 are used by operators of sub-ocean vehicles to see objects in front of them and by their clients for inspection and exploration purposes. Data from these cameras can also be used to generate mosaic views of the ocean floor. Furthermore, with a downward-pointing camera, "optical flow" information can be extracted to generate estimates of the vehicle speed and direction relative to the ocean floor.

The gravimeter 1352 detect very small variations in local gravitational fields. They can be used to find deposits of metals (increased gravitation) and buried gas (decreased gravitation).

Figure 15:
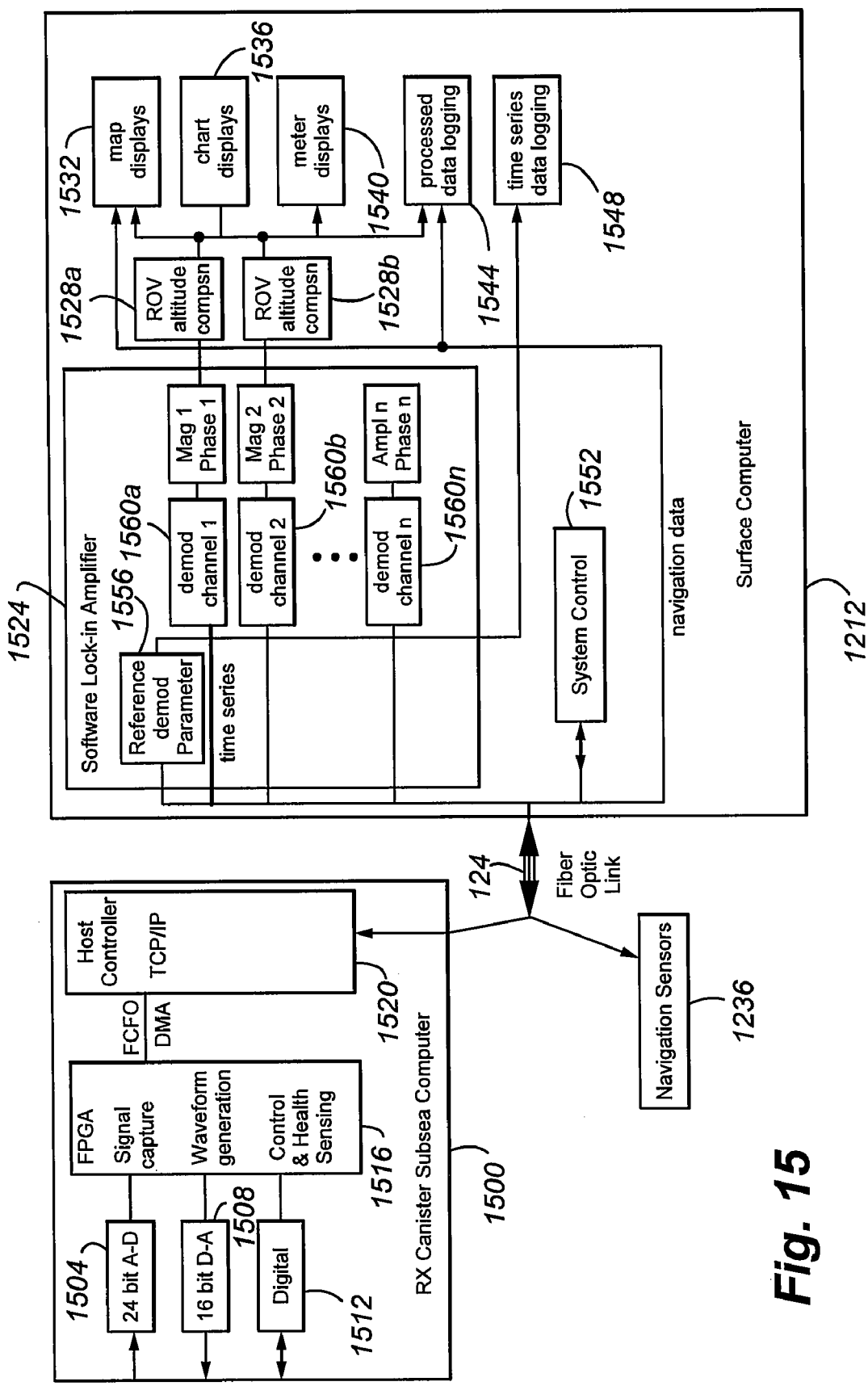
FIG. 15 is a block diagram of the subsea canister and surface computers according to an embodiment.

FIG. 15 depicts an embodiment of the geophysical system, which includes not only the EM surface computer 1212 but also a sub-ocean computer 1500 typically housed in the Receiver Canister 1232 positioned on the ROV 100.

The sub-ocean computer 1500 performs data acquisition, data output, effects energization of the coil 112 by generating the time or frequency variant waveform, control functions (e.g. turning additional instruments on and off), and health monitoring, (e.g., monitoring temperatures, water alarms, ground faults, power amplifier status) and communicates with the surface computer 1212 via standard TCP/IP Ethernet protocols. The computer 1500 includes an Analog-to-Digital ("A-D") converter 1504, a Digital-to-Analog ("D-A") converter 1508, a digital interface 1512, a Floating Point Gate Array ("FPGA") 1516 performing signal capture, waveform generation, and control and health sensing, and a host controller 1520. The waveform is converted, by the D-A converter 1508 to an analog signal and fed to the transmitter canister (1230) power amplifier. The A-D converter 1504 receives the detection signals from the sensor(s) 116. The signals detected by the sensor(s) 116 are very small and are sampled by the A-D converter 1504 at high rates (typically 20 kHz) and at high resolution (typically 24 bits). The reason for sampling at these high rates is to improve noise rejection at the very low signal levels and to assist the surface-based lock-in amplifiers in determining very precise amplitude and phase measurements with respect to the transmitted signal. The sub-ocean computer 1500 can also inputs a signal from "sniffer coils", which measure the field strength of the transmitted waveform.

The data from the sub-ocean computer 1500 and navigation sensors 1236 is forwarded by a fiber optic link in the umbilical 124 as packets to the surface computer 1212. The fiber optic link includes an optical fiber for signal transmission, plus digital hardware modulators and demodulators at each end. At the bottom end, it connects to the TCP/IP interface to the sub-ocean computer 1500 and the navigation sensors 1236 via specific hardware interfaces. At the top end, it interfaces to the surface computer 1212 and to other devices which are specific to the mission and to the navigation sensors 1236.

In some variations, the surface computer 1212 provides the instrument operator at the ocean surface or a remote location the ability to control the system and review data as it is collected. He may adjust the system operating parameters and analyze the results of the measurements in real time. In other variations, the system operates independently, instructions for operation are pre-programmed, and the data is reviewed later when the ROV is recovered. For example, the instrument might be mounted on an ROV below the sea surface, and the operator might be located remotely to the ROV mother ship at a location on shore.

The surface computer 1212 comprises a software lock-in amplifier 1524, first and second ROV altitude compensation modules 1528a-b, map displays 1532, chart displays 1536, meter displays 1540, processed data logging module 1544, time series data logging module 1548, and system control 1552. The software lock-in amplifier 1524 is a significant part of the signal processing function. It inputs a reference signal from each "sniffer coil", which tells it the magnitude and phase of the electromagnetic coil 112 driving current, and the received signal from each sensor 116. The amplifier 1524 then calculates the magnitude of the received signal at the transmitted signal's frequency and phase of the received signal relative to the transmitted signal. The lock-in amplifier 1524 can provide an effective way to measure the amplitude and phase of the signal in the presence of noise. The noise is removed by performing a Fourier transform on the input signal at the frequency and phase carried by the reference signal. The Fourier transform is performed by the inputting the reference demodulation parameter 1556 and input signal into a plurality of demodulation channels 1560a-n, each of which corresponds to a particular magnitude and phase. A lock-in amplifier acts as a narrow band-pass filter around the reference signal frequency.

Figure 16:
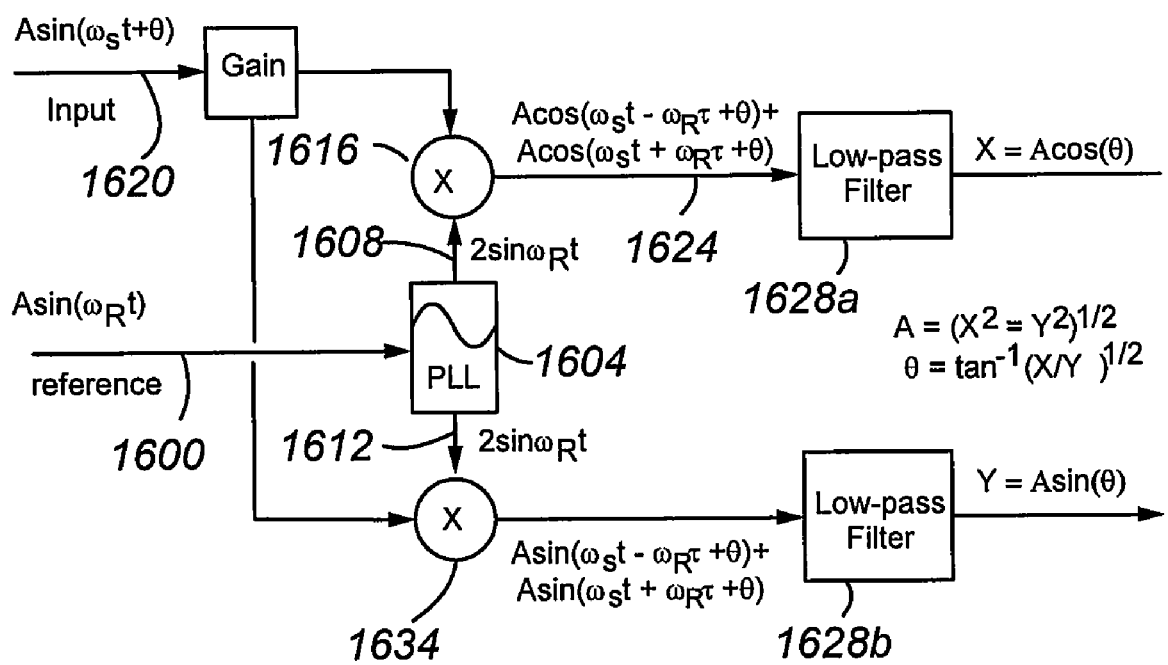
FIG. 16 is a block diagram of a signal processing architecture according to an embodiment.

With reference to FIG. 16, the reference signal 1600 is fed into an internal reference synthesizer 1604 that extracts frequency and phase information from the reference signal and generates a pure sine wave 1608 and a pure cosine wave 1612. The sine wave 1608 is then mixed 1616 with the input signal 1620 to form a mixed signal 1624. For each frequency component in the input signal 1620, the mixer 1616 generates two output components: one with the frequency equal to the difference between the frequencies of the internal reference 1600 and the signal component ($\omega_R-\omega_S$) 1620 and one equal to the sum of the two frequencies ($\omega_R+\omega_S$). Note that, in a typical case, the input signal 1620 has the same fundamental frequency as the reference signal 1600. (It may also include some low-amplitude, higher frequency harmonics due to non-linear distortion, but these will be removed by the downstream low-pass filters 1628a-b.)

Because the input signal 1620 has the same frequency as the reference ($\omega_S=\omega_R$), the first mixer component will have frequency equal to 0 (a DC signal), and the second mixer component will have frequency equal to twice the reference frequency ($2\omega_R$). The low-pass filter 1628a that follows the mixer 1616 is set to reject everything but the DC (first) component. The magnitude of this component is proportional to the amplitude of the input signal 1620 specifically, its fundamental component at $\omega_R$) and the cosine of its phase relative to the phase of the reference signal ($A \cdot \cos(\theta)$). This quantity is referred to as "X."

The same process is applied to the input signal 1620 by the mixer 1634 using the pure cosine wave at $\omega_R$, and quantity "Y" is generated. Y is proportional to the amplitude of the signal component times the sine of the phase shift ($A \cdot \sin(\theta)$).

From these two quantities, the amplitude (A, being the vector sum of X and Y) and relative phase (R, being the angle whose tangent is the ratio of the two quantities) of the input signal can be calculated.

The ROV altitude compensation modules 1528a-b apply correction factors to the magnitude data output from the Software Lock-In Amplifier 1524. If the ROV is moving over the bottom at a constant altitude, any change in magnitude can be attributed to changes in conductivity. However, if the platform is changing altitude, then changes in conductivity may be masked.

A simple method for generating a compensation function uses actual data. Once the electromagnetic sensor 116 is integrated with its platform (e.g., the ROV), the sensor 116 is passed over a site that has varying levels of conductivity with continuously varying altitude. The altitude variations are selected to be typical of those that will be achieved during the upcoming survey. Once the data has been collected, plots of (a) average magnitude response vs. altitude and (b) standard deviation of magnitude response vs. altitude are generated. The magnitude response is approximated with a simple, smooth, inflection-free polynomial function. This polynomial function is programmed into the altitude compensation module.

Once the altitude compensation module has been configured, it modifies the magnitude data in real time before it is logged and displayed to the operator.

The System Control module 1552 provides displays and controls to the operator such as water alarm and ground fault alarm displays, select meter displays, change calibration parameters, and configure and control logging behaviors.

The various display modules 1532, 1536, and 1540 provide various displays to the operator.

The modules 1544 and 1548 log raw (time series) and processed data.

Signal Processing Methodology

Figure 17:
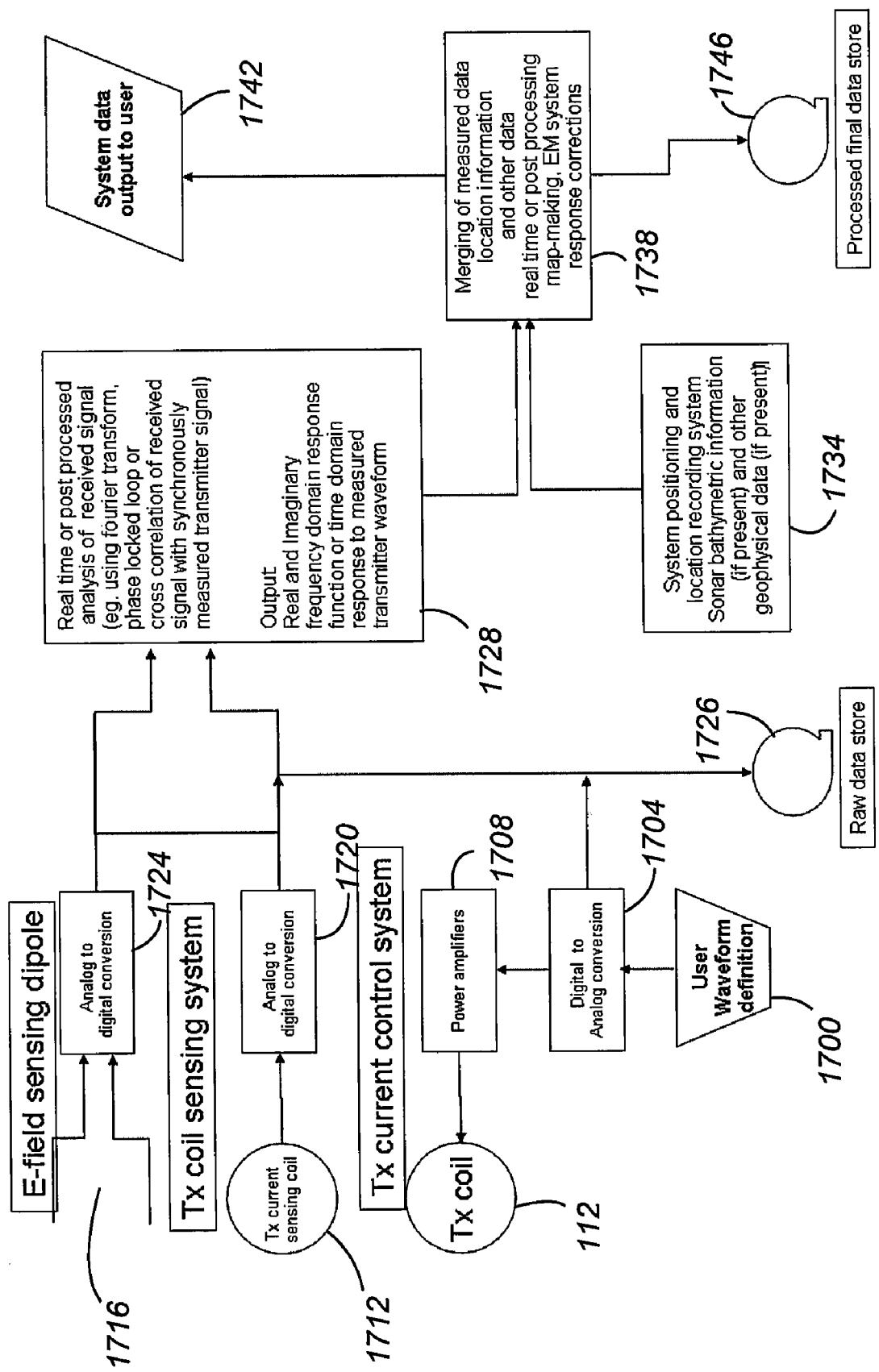
FIG. 17 is a block diagram of a signal processing architecture according to an embodiment.

FIG. 17 depicts the methodology of one embodiment to process the various input signals.

The measurement is initiated by user selection (step 1700) of a suitable waveform definition to be inputted into the FGPA 1516. The waveform selected is not limited to a sinusoidal waveform but may be any desirable waveform, such as a triangular waveform, square waveform, boxcar waveform, saw-tooth waveform, pseudo-random waveform, and combinations thereof. By way of illustration, when a triangular waveform is used to drive the coil 112, Faraday's law holds that the induced current around the sensor will have a square-wave profile. However, other effects will limit the sharp transitions. By looking at the differences between the transmit and receive waveforms at the sharp transitions, one may be able to infer other information regarding the ocean floor 128. For example, at low frequencies one would expect to observe induced polarization (IP) effects. The frequency of the AC excitation can be varied over a wide range, e.g. from about 5 Hz to about 500 Hz. (Skin depth vs. gain)

The selected waveform definition is converted into an analog equivalent (step 1704) and thereafter directed to a raw data store 1726 and inputted into the FPGA 1516 (step 1708), and the generated electrical current waveform inputted into the coil 112. As noted, the magnetic (H) field from the electrical current passing through the energized coil 112 will induce electrical eddy currents of a predetermined waveform in the surrounding electrically conduct medium. In the case of a triangular wave as the generated electrical current waveform for example, the eddy currents will be in the form of square waveforms.

The H-field sensing "Sniffer" coil 1712 receives signals related to the transmitted field output from the transmitter coil 112. The sensor 116, which is shown as an E-field sensing dipole 1716, receives signals related to the corresponding E-field. The received signal(s) are converted by the A-D converters 1504 (steps 1720 and 1724 respectively) to digital equivalent(s). The selected analog waveform provided to the transmitter coil 112 and the digital equivalents of the measured H- and E-fields are stored in raw data store 1726.

In step 1728, the real time or post processed analysis of the received signal(s), such as Fourier transform, phase locked loop, or cross correlation of received signal(s) with synchronously measured transmitter signal, is performed. The H-field sensing coil 1712 synchronously measures the transmitter signal. The output of this step are a real and imaginary frequency domain response function and/or time domain response to the measured transmitted waveform. By measuring the in and out of phase response at all frequencies, the responses can be converted into an equivalent time domain response, and, by measuring the time response at all times, a measured time response can be converted into an equivalent in and out of phase response.

In step 1734, system positioning and location recording measurements and sonar bathymetric information (if present) and other geophysical data (if present) are retrieved.

The outputs of steps 1728 and 1734 are provided to step 1738. In step 1738, the measured data location information from step 1734 is merged with the response function/response from step 1728, electromagnetic system response corrections applied, and real time or post processing and map-making performed. The output of step 1738 is either provided to the user as data output (step 1742) or stored in the processed final data store (step 1746).

The Geophysical Surveying Method

Prior to conducting geophysical surveys, the system is normally operated in open water to take test measurements and calibrate the system. Although one can model the relationship between coil current, coil geometry, and electrode geometry, some variations will always be present. Furthermore, local resistivity will be distorted by the need to deploy the sensor 116 on a submersible vehicle. The submersible vehicle will include a combination of conductive and resistive components, which will distort the local resistivity. With the transmitter coil 112 transmitting and sensor 116 receiving, one can observe changes in electrode voltage as the submersible vehicle approaches the ocean floor, depending on whether the bottom is more or less conductive than seawater. This is a very simple qualitative test of bottom conductivity. Similarly, one can observe the electrode voltage move back to its normal condition as the vehicle departs from the seafloor Following testing and calibration, the submersible vehicle commences a survey pattern by flying over the ocean floor 128 and logging the following information:

transmitter output level,
electrode voltage to determine conductivity,
altitude to calibrate conductivity, and
geographical position (latitude, longitude, depth)—to allow conductivity maps to be generated.

Additional information that is usually logged in normal operation includes:

terrain below the host vehicle (to allow simultaneous generation of terrain and conductivity maps), and
sub-bottom profiles—to estimate the thickness of the sediment below the host vehicle, to improve the estimate of altitude over the ore-bearing rock in the ocean floor.

Based on the logged data, geophysical mapping is performed.

Rather than fly the system at a fixed altitude above the ocean floor 128, one can exploit the behavior that is presented when approaching and departing from the ocean floor 128 by "dipping" along. In "dipping", the vehicle's altitude is altered in a periodic fashion while continuously monitoring the resulting electrode voltage.

As will be appreciated, the system is not limited to detecting deposits in a sea environment. It can be used for detecting any type of object with anomalous resistive or conductive properties on or embedded within the ocean floor. For example, it may be used for finding pipes or other similar objects. It can be used to measure the in-situ conductivity of a conductive fluid. It can also be used to detect salt-water lenses or fresh water lenses in a body of water other than seawater, or used to measure the apparent resistivity of the bottom of a lake or river. If the transmitter coil is in air above an the fluid can be used to estimate the conductivity of the fluid, and various geometric interface with a conductive fluid below it such as water, then the current distribution in properties of the fluid, such as depth.

EXPERIMENTAL

A prototype geophysical system of the type shown in FIGS. 5-7 was used for electromagnetic surveys over a copper mineral prospect located at 1700 m depth. The mineral prospect has been previously drilled and assayed.

FIG. 19 is a bathymetric map showing the mineralized and non-mineralized drill holes, drill holes awaiting assay results, the projected extent of the mineralized system based on drilling assays, and the observed sulfide outcrop.

FIG. 18 shows the electromagnetic response measured by the prototype geophysical system. The mineralized area projected by the measured electromagnetic response correlates closely with the mineralized area determined by the drilling program.

The exemplary systems and methods of this invention have been described in relation to ROV-based ocean floor surveys. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a autonomous underwater vehicles, towed devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, fiber optics, acoustic links, and laser beams and may take the form of acoustic or light waves, such as those generated during radio-wave, blue-green laser, and acoustic telemetry data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the vertically oriented transmitter coil used to create the time varying magnetic field is replaced with a horizontal moving electric dipole. In this embodiment, the sensor is a coil optimally positioned in the vertical plane of the transmitter dipole, or an electric field measuring dipole optimally positioned in the vertical plane of the transmitter current dipole.

In yet another embodiment, a conductivity meter is added to the system to measure the background conductivity of the ocean water. This will provide a baseline value to correct the response of the system; the system measures an anomalous value when close to the bottom that is referenced to a value measured when surrounded by sea water and distant from the bottom.

In other embodiments, additional electric or magnetic field sensors are deployed so that parameters relating to an asymetric orebody response can be measured.

In another embodiment, the system has a very large, high current transmitter loop deployed from a ship in which case the E-Field is measured below the loop either with a captive, or a free-swimming, sensor. This variant of the system would have considerable depth penetration.

In other embodiments, the system and additional mapping sensors are modularized so that they can be deployed on standard underwater vehicles and platforms. These might be ROVs, AUVs, manned submersibles, towed bodies, gliders, or bottom crawling systems.

In another alternative embodiment, the data logging and navigation systems are omitted, so that the instrument only reports the instantaneous readings to a display for immediate interpretation.

In yet another embodiment, the coil 112 is replaced with an electrode pair.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A geophysical method, comprising:
   (a) providing at least one transmitter, the at least one transmitter having an axis thereof oriented horizontally;
   (b) providing at least one electric field sensor, positioned below the at least one transmitter to measure an ambient electrical parameter associated with a conductive medium external to and surrounding the at least one transmitter wherein the at least one electric field sensor comprises a first electrode and a second electrode;
   (c) passing, through the at least one transmitter, electrical energy having a selected waveform, whereby eddy currents are induced in the conductive medium; and
   (d) during the passing step (c), receiving, from the at least one electric field sensor, a signal proportional to the measured ambient electrical parameter, wherein a distance between the at least one transmitter and the at least one electric field sensor is adjustable by an operator, wherein the at least one transmitter and the at least one electric field sensor are interconnected at a substantially fixed distance when in operation performing the geophysical method, and wherein the first and second electrodes lie in a plane that is substantially parallel with a plane of the at least one transmitter.

2. The method of claim 1, wherein the at least one transmitter is at least one coil, the at least one coil oriented with its windings oriented vertically and with its magnetic axis oriented horizontally, wherein the at least one coil provides a substantially horizontal magnetic dipole, wherein a major axis of the at least one coil is oriented horizontally, and wherein a plane of the at least one coil is substantially coplanar with a plane defined by the at least one sensor.

3. The method of claim 1, wherein the at least one transmitter is at least one coil, wherein the electrical parameter is a voltage parallel to the coil windings of the at least one coil.

4. The method of claim 1, wherein the at least one transmitter is at least one coil, wherein the conductive medium is an ocean, wherein the at least one transmitter is positioned in proximity to a floor of the ocean, wherein the at least one sensor is positioned between the transmitter and the ocean floor, and wherein at least part of an excitation field generated by step (c) is directed downward into the ocean floor.

5. The method of claim 1, wherein the at least one transmitter is at least one coil, wherein the at least one transmitter comprises first and second coils positioned one on top of the other, wherein the at least one sensor is positioned below both of the first and second coils, and wherein the first and second coils are excited by the electrical energy at least one of different times and different frequencies.

6. The method of claim 1, wherein the at least one transmitter is at least one coil, wherein the at least one coil and the at least one sensor are mounted on a common submersible vehicle.

7. The method of claim 1, wherein the at least one transmitter is at least one coil, further comprising:
   (e) receiving a measured signal from the at least one sensor;
   (f) receiving a reference signal from a second sensor, the reference signal indicating a magnitude and phase of the electrical energy passing through the at least one transmitter; and
   (g) determining a magnitude of the measured signal at a frequency of the electrical energy and a phase of the measured signal.

8. The method of claim 1, wherein the at least one transmitter is at least one coil, further comprising:
   (e) receiving a measured signal from the at least one sensor;
   (f) receiving a reference signal from a second sensor, the reference signal indicating a magnitude and phase of the electrical energy passing through the at least one transmitter;
   (g) generating a sine and cosine wave components of the reference signal;
   (h) mixing the sine wave component with the measured signal to provide a first mixed signal having first and second sine wave components, the first sine wave component having a frequency equal to a difference between frequencies of the reference and measured signals and the second sine wave component having a frequency equal to a sum of the frequencies of the reference and measured signals;

(i) thereafter rejecting the second sine wave component;

(j) mixing the cosine wave component with the measured signal to provide a second mixed signal having first and second cosine wave components, the first cosine wave component having a frequency equal to a difference between frequencies of the reference and measured signals and the second cosine wave component having a frequency equal to a sum of the frequencies of the reference and measured signals;

(k) thereafter rejecting the second cosine wave component;

(l) determining first and second values, the first value being a product of an amplitude of the first sine wave component and a phase shift and the second value being a product of an amplitude of the first cosine wave component and the phase shift; and (m) determining, based on the first and second values, an amplitude and relative phase of the measured signal.

9. The method of claim 1, wherein the at least one transmitter is at least one coil, wherein step (c) comprises the substep:

(C1) selecting the selected waveform to produce a desired waveform in ambient electrical energy in the conductive medium induced by the electrical energy passed through the transmitter; and further comprising:

(e) thereafter analyzing a difference between the selected waveform and the produced waveform to determine an induced polarization effect.

10. The method of claim 1, wherein the at least one transmitter is at least one coil, wherein in step (c) at least one of first and second measured signals are received by at least one of first and second sensors, the first signal measuring an ambient electrical parameter associated with the conductive medium and further comprising:

(e) processing the at least one of first and second signals to output at least one of (i) a real and imaginary frequency domain response and (ii) a time domain response to the electrical energy passed through the at least one transmitter.

11. The method of claim 1, wherein the conductive medium is an ocean, wherein the at least one transmitter is positioned in proximity to a floor of the ocean, and wherein the signal received in step (d) as compared with the position of the at least one transmitter in proximity to the floor of the ocean enables calibration of the signal.

12. A geophysical system, comprising:

(a) at least one transmitter, the at least one transmitter having an axis thereof oriented horizontally;

(b) at least one electric field sensor, positioned below the at least one transmitter to measure an ambient electrical parameter associated with a conductive medium external to and surrounding the at least one transmitter wherein the at least one electric field sensor comprises a first electrode and a second electrode;

(c) a power source operable to pass, through the at least one transmitter, electrical energy having a selected waveform whereby eddy currents are induced in the conductive medium, wherein, while passing electrical energy through the at least one transmitter, the at least one electric field sensor receives a signal proportional to the measured ambient electrical parameter; and (d) wherein a distance between the at least one transmitter and the at least one electric field sensor is adjustable by an operator, wherein the at least one transmitter and the at least one electric field sensor are interconnected at a substantially fixed distance when in operation as a geophysical system, and wherein the first and second electrodes lie in a plane that is substantially parallel with a plane of the at least one transmitter.

13. The system of claim 12, wherein the at least one transmitter is at least one coil, wherein the at least one coil provides a substantially horizontal magnetic dipole, wherein a major axis of the at least one coil is oriented horizontally, and wherein a plane of the at least one coil is coplanar with a plane defined by the at least one sensor.

14. The system of claim 12, wherein the at least one transmitter is at least one coil, wherein the electrical parameter is a voltage parallel to the coil windings of the at least one coil.

15. The system of claim 12, wherein the at least one transmitter is at least one coil, wherein the conductive medium is an ocean, wherein the at least one transmitter is positioned in proximity to a floor of the ocean, wherein the at least one sensor is positioned between the transmitter and the ocean floor, and wherein at least part of an excitation field generated by step (c) is directed downward into the ocean floor.

16. The system of claim 12, wherein the at least one transmitter is at least one coil, wherein the at least one transmitter comprises first and second coils positioned one on top of the other, wherein the at least one sensor is positioned below both of the first and second coils, and wherein the first and second coils are excited by the electrical energy at different times.

17. The system of claim 12, wherein the at least one transmitter is at least one coil, wherein the at least one transmitter and the at least one sensor are mounted on a common submersible vehicle.

18. The system of claim 12, wherein the at least one transmitter is at least one coil, further comprising:

(e) a first input to receive a measured signal from the at least one sensor;

(f) a second input to receive a reference signal from a second sensor, the reference signal indicating a magnitude and phase of the electrical energy passing through the at least one transmitter; and (g) a processor operable to determine a magnitude of the measured signal at a frequency of the electrical energy and a phase of the measured signal.

19. The system of claim 12, wherein the at least one transmitter is at least one coil, further comprising:

(e) a first input operable to receive a measured signal from the at least one sensor;

(f) a second input operable to receive a reference signal from a second sensor, the reference signal indicating a magnitude and phase of the electrical energy passing through the at least one transmitter;

(g) a synthesizer operable to generate a sine and cosine wave components of the reference signal;

(h) a first mixer operable to mix the sine wave component with the measured signal to provide a first mixed signal having first and second sine wave components, the first sine wave component having a frequency equal to a difference between frequencies of the reference and measured signals and the second sine wave component having a frequency equal to a sum of the frequencies of the reference and measured signals;

(i) a first filter operable to reject the second sine wave component;

(j) a second mixer operable to mix the cosine wave component with the measured signal to provide a second mixed signal having first and second cosine wave components, the first cosine wave component having a frequency equal to a difference between frequencies of the reference and measured signals and the second cosine wave component having a frequency equal to a sum of the frequencies of the reference and measured signals;

(k) a second filter operable to reject the second cosine wave component; and (l) a processor operable to determine first and second values, the first value being a product of an amplitude of the first sine wave component and a phase shift and the second value being a product of an amplitude of the first cosine wave component and the phase shift, and to determine, based on the first and second values, an amplitude and relative phase of the measured signal.

20. The system of claim 12, wherein the at least one transmitter is at least one coil, further comprising a processor operable to select the selected waveform to produce a desired waveform in ambient electrical energy in the conductive medium induced by the electrical energy passed through the transmitter, and thereafter analyze a difference between the selected waveform and the produced waveform to determine an induced polarization effect.

21. The system of claim 12, wherein the at least one transmitter is at least one coil, wherein at least one of first and second measured signals are received by at least one of first and second sensors, the first signal measuring an ambient electrical parameter associated with the conductive medium and further comprising:

(e) a processor operable to process the at least one of first and second signals to output at least one of (i) a real and imaginary frequency domain response and (ii) a time domain response to the electrical energy passed through the at least one transmitter.

22. The system of claim 12, wherein the conductive medium is an ocean, wherein the at least one transmitter is positioned in proximity to a floor of the ocean, and wherein the signal received in step (c) as compared with the position of the at least one transmitter in proximity to the floor of the ocean enables calibration of the signal.

23. A geophysical method, comprising:

(a) providing at least one transmitter, the at least one transmitter having an axis thereof oriented horizontally and is at least one coil;

(b) providing at least one sensor, positioned below the at least one transmitter to measure at least one of an ambient electrical and magnetic parameter associated with a conductive medium external to and surrounding the at least one transmitter;

(c) passing, through the at least one transmitter, electrical energy having a selected waveform;

(d) during the passing step (c), receiving, from the at least one sensor, a signal proportional to the measured at least one of an ambient electrical and magnetic parameter;

(e) receiving a measured signal from the at least one sensor;

(f) receiving a reference signal from a second sensor, the reference signal indicating a magnitude and phase of the electrical energy passing through the at least one transmitter;

(g) generating a sine and cosine wave components of the reference signal;

(h) mixing the sine wave component with the measured signal to provide a first mixed signal having first and second sine wave components, the first sine wave component having a frequency equal to a difference between frequencies of the reference and measured signals and the second sine wave component having a frequency equal to a sum of the frequencies of the reference and measured signals;

(i) thereafter rejecting the second sine wave component;

(j) mixing the cosine wave component with the measured signal to provide a second mixed signal having first and second cosine wave components, the first cosine wave component having a frequency equal to a difference between frequencies of the reference and measured signals and the second cosine wave component having a frequency equal to a sum of the frequencies of the reference and measured signals;

(k) thereafter rejecting the second cosine wave component;

(l) determining first and second values, the first value being a product of an amplitude of the first sine wave component and a phase shift and the second value being a product of an amplitude of the first cosine wave component and the phase shift; and (m) determining, based on the first and second values, an amplitude and relative phase of the measured signal.

24. A geophysical method, comprising:

(a) providing at least one transmitter, the at least one transmitter having an axis thereof oriented horizontally and is at least one coil;

(b) providing at least one sensor, positioned below the at least one transmitter to measure at least one of an ambient electrical and magnetic parameter associated with a conductive medium external to and surrounding the at least one transmitter;

(c) passing, through the at least one transmitter, electrical energy having a selected waveform, and selecting the selected waveform to produce a desired waveform in ambient electrical energy in the conductive medium induced by the electrical energy passed through the transmitter;

(d) during the passing step (c), receiving, from the at least one sensor, a signal proportional to the measured at least one of an ambient electrical and magnetic parameter; and (e) thereafter analyzing a difference between the selected waveform and the produced waveform to determine an induced polarization effect.

25. A geophysical system, comprising:

(a) at least one transmitter, the at least one transmitter having an axis thereof oriented horizontally and is at least one coil;

(b) at least one sensor, positioned below the at least one transmitter to measure at least one of an ambient electrical and magnetic parameter associated with a conductive medium external to and surrounding the at least one transmitter;

(c) a power source operable to pass, through the at least one transmitter, electrical energy having a selected waveform, wherein, while passing electrical energy through the at least one transmitter, the at least one sensor receives a signal proportional to the measured at least one of an ambient electrical and magnetic parameter;

(d) a first input operable to receive a measured signal from the at least one sensor;

(e) a second input operable to receive a reference signal from a second sensor, the reference signal indicating a magnitude and phase of the electrical energy passing through the at least one transmitter;

(f) a synthesizer operable to generate a sine and cosine wave components of the reference signal;

(g) a first mixer operable to mix the sine wave component with the measured signal to provide a first mixed signal having first and second sine wave components, the first sine wave component having a frequency equal to a difference between frequencies of the reference and measured signals and the second sine wave component having a frequency equal to a sum of the frequencies of the reference and measured signals;

(h) a first filter operable to reject the second sine wave component;
(i) a second mixer operable to mix the cosine wave component with the measured signal to provide a second mixed signal having first and second cosine wave components, the first cosine wave component having a frequency equal to a difference between frequencies of the reference and measured signals and the second cosine wave component having a frequency equal to a sum of the frequencies of the reference and measured signals;
(j) a second filter operable to reject the second cosine wave component; and
(k) a processor operable to determine first and second values, the first value being a product of an amplitude of the first sine wave component and a phase shift and the second value being a product of an amplitude of the first cosine wave component and the phase shift, and to determine, based on the first and second values, an amplitude and relative phase of the measured signal.

26. A geophysical system, comprising:
(a) at least one transmitter, the at least one transmitter having an axis thereof oriented horizontally and is at least one coil;
(b) at least one sensor, positioned below the at least one transmitter to measure at least one of an ambient electrical and magnetic parameter associated with a conductive medium external to and surrounding the at least one transmitter;
(c) a power source operable to pass, through the at least one transmitter, electrical energy having a selected waveform, wherein, while passing electrical energy through the at least one transmitter, the at least one sensor receives a signal proportional to the measured at least one of an ambient electrical and magnetic parameter; and
(d) a processor operable to select the selected waveform to produce a desired waveform in ambient electrical energy in the conductive medium induced by the electrical energy passed through the transmitter, and thereafter analyze a difference between the selected waveform and the produced waveform to determine an induced polarization effect.

* * * * *